(12) United States Patent
Dewagamage et al.

(10) Patent No.: US 9,860,010 B2
(45) Date of Patent: Jan. 2, 2018

(54) TRANSMISSION DEVICE, CONTROL CARD, AND TRANSMISSION METHOD

(71) Applicant: FUJITSU LIMITED, Kawasaki-shi, Kanagawa (JP)

(72) Inventors: Danasiri Wijedasa Dewagamage, Yokohama (JP); Tatsuya Shoho, Yokohama (JP); Toshihiro Furudate, Yokohama (JP); Nobuo Sashida, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 432 days.

(21) Appl. No.: 14/143,446

(22) Filed: Dec. 30, 2013

(65) Prior Publication Data

US 2014/0289397 A1  Sep. 25, 2014

(30) Foreign Application Priority Data

Mar. 19, 2013 (JP) .................................. 2013-057378

(51) Int. Cl.
*H04L 12/26* (2006.01)
*H04J 14/02* (2006.01)
*H04L 12/24* (2006.01)

(52) U.S. Cl.
CPC ...... *H04J 14/0201* (2013.01); *H04L 41/0836* (2013.01); *H04L 41/147* (2013.01);
(Continued)

(58) Field of Classification Search
CPC ............. H04L 41/0836; H04L 41/5025; H04L 41/147; H04L 43/065; H04L 12/26;
(Continued)

(56) References Cited

U.S. PATENT DOCUMENTS 6,209,033 B1 * 3/2001 Datta .................. H04L 41/0813
370/232
8,185,909 B2 * 5/2012 Sigal ....................... G06F 9/505
706/12

(Continued)

FOREIGN PATENT DOCUMENTS

JP 2007-116648 5/2007

*Primary Examiner* — Anthony Mejia
*Assistant Examiner* — Mehulkumar Shah
(74) *Attorney, Agent, or Firm* — Staas & Halsey LLP

(57) ABSTRACT

A transmission device includes: a calculation unit to detect abnormal traffic based on a traffic volume collected for the route and to calculate a traffic increase/decrease time and a traffic increase/decrease volume of the abnormal traffic; a normal prediction graph generation unit to generate a normal prediction graph based on the traffic volume in normal time in which the abnormal traffic is not detected; a prediction graph generation unit to generate an abnormal prediction graph based on the traffic increase/decrease time and the traffic increase/decrease volume of the abnormal traffic in detection of the abnormal traffic; an order determination unit to determine a line order that is a priority order of line allocation for the route based on the normal prediction graph or the abnormal prediction graph; and an optimization unit to determine lines that are to be allocated to the route based on the line order.

10 Claims, 32 Drawing Sheets

(52) U.S. Cl.
CPC ...... *H04L 41/5025* (2013.01); *H04J 14/0283* (2013.01); *H04L 43/065* (2013.01)

(58) Field of Classification Search
CPC ... H04L 43/04; H04L 29/08072; H04L 29/06; H04L 43/00; H04L 12/2602; H04L 41/22; H04J 14/0201; H04J 14/0283
USPC .............................. 709/224; 370/254, 252
See application file for complete search history.

(56) References Cited

U.S. PATENT DOCUMENTS

| | | | |
|---|---|---|---|
| 2003/0126246 A1* | 7/2003 | Blouin | H04L 41/0896 709/223 |
| 2005/0125195 A1* | 6/2005 | Brendel | H04L 43/00 702/182 |
| 2007/0055477 A1* | 3/2007 | Chickering | G06K 9/00503 702/182 |
| 2007/0195700 A1* | 8/2007 | Katoh | H04L 41/147 370/235 |

* cited by examiner

FIG. 3

|  |  |  | CL-LIU A | | | | ... | CL-LIU E | | | |
|---|---|---|---|---|---|---|---|---|---|---|---|
| DATE | DAY OF THE WEEK | HOLIDAY | TIME | | | | ... | TIME | | | |
|  |  |  | 00:00 | 00:01 | ... | 23:59 | ... | 00:00 | 00:01 | ... | 23:59 |
| YEAR1/1/1 | MONDAY | - | 131 Mb | 130 Mb | ... | 128 Mb | ... | 110 Mb | 131 Mb | ... | 113 Mb |
| YEAR1/1/2 | TUESDAY | - | 135 Mb | 134 Mb | ... | ... | ... | ... | ... | ... | ... |
| YEAR1/1/3 | WEDNESDAY | HOLIDAY | 276 Mb | 270 Mb | ... | ... | ... | ... | ... | ... | ... |
| YEAR1/1/4 | THURSDAY | - | 128 Mb | ... | ... | ... | ... | ... | ... | ... | ... |
| ... | ... | ... | ... | ... | ... | ... | ... | ... | ... | ... | ... |
| YEAR1/12/31 | ... | ... | 128 Mb | ... | ... | ... | ... | ... | ... | ... | ... |
| YEAR2/1/1 | ... | ... | 131 Mb | ... | ... | ... | ... | ... | ... | ... | ... |
| YEAR2/1/2 | ... | ... | 129 Mb | ... | ... | ... | ... | ... | ... | ... | ... |
| ... | ... | ... | ... | ... | ... | ... | ... | ... | ... | ... | ... |
| YEAR2/12/31 | ... | ... | 134 Mb | ... | ... | ... | ... | ... | ... | ... | ... |

FIG. 4

| CL-LIU | DATE | | TIME | | | | |
|---|---|---|---|---|---|---|---|
| | | | 00:00 | 00:01 | 00:02 | ... | 23:59 |
| CL-LIU A | WEEKDAY | UPPER LIMIT | 148 Mb | 147 Mb | 147 Mb | ... | 149 Mb |
| | | AVERAGE TRAFFIC | 128 Mb | 127 Mb | 127 Mb | ... | 129 Mb |
| | | LOWER LIMIT | 108 Mb | 107 Mb | 107 Mb | ... | 109 Mb |
| | SATURDAY | UPPER LIMIT | 532 Mb | ... | ... | ... | ... |
| | | AVERAGE TRAFFIC | 560 Mb | ... | ... | ... | ... |
| | | LOWER LIMIT | 528 Mb | ... | ... | ... | ... |
| | SUNDAY/ HOLIDAY | UPPER LIMIT | 428 Mb | ... | ... | ... | ... |
| | | AVERAGE TRAFFIC | 399 Mb | ... | ... | ... | ... |
| | | LOWER LIMIT | 370 Mb | ... | ... | ... | ... |
| ... | ... | ... | ... | ... | ... | ... | ... |
| CL-LIU E | WEEKDAY | UPPER LIMIT | 224 Mb | 222 Mb | 221 Mb | ... | 225 Mb |
| | | AVERAGE TRAFFIC | 199 Mb | 197 Mb | 196 Mb | ... | 198 Mb |
| | | LOWER LIMIT | 174 Mb | 172 Mb | 171 Mb | ... | 173 Mb |
| | SATURDAY | UPPER LIMIT | 432 Mb | ... | ... | ... | ... |
| | | AVERAGE TRAFFIC | 418 Mb | ... | ... | ... | ... |
| | | LOWER LIMIT | 404 Mb | ... | ... | ... | ... |
| | SUNDAY/ HOLIDAY | UPPER LIMIT | 333 Mb | ... | ... | ... | ... |
| | | AVERAGE TRAFFIC | 315 Mb | ... | ... | ... | ... |
| | | LOWER LIMIT | 297 Mb | ... | ... | ... | ... |

FIG. 5

| CL-LIU | TIME | | | | |
|---|---|---|---|---|---|
| | 10:20 (CURRENT TIME) | 10:21 | 10:22 | ... | 10:19 |
| CL-LIU A CARD | 142 Mb | 145 Mb | 148 Mb | ... | 110 Mb |
| CL-LIU B CARD | 132 Mb | 133 Mb | 134 Mb | ... | 132 Mb |
| ... | ... | ... | ... | ... | ... |
| CL-LIU E CARD | 222 Mb | 224 Mb | 225 Mb | ... | 221 Mb |

FIG. 6

| CL-LIU | TRAFFIC INFORMATION | LINE NUMBER | TIME | | | |
|---|---|---|---|---|---|---|
| | | | PREDICTION TIME T1 | PREDICTION TIME T2 | PREDICTION TIME T3 | PREDICTION TIME T4 |
| CL-LIU A CARD | PREDICTION UNUSED TOTAL TRAFFIC VOLUME | LINE L1 | a11 | a21 | a31 | a41 |
| | | LINE L2 | a12 | a22 | a32 | a42 |
| | | ... | ... | ... | ... | ... |
| | | LINE L8 | a18 | ... | ... | ... |
| | PREDICTION TOTAL TRAFFIC VOLUME | LINE L1 | A11 | ... | ... | ... |
| | | LINE L2 | A12 | ... | ... | ... |
| | | ... | ... | ... | ... | ... |
| | | LINE L8 | A18 | ... | ... | ... |
| CL-LIU B CARD | ... | ... | ... | ... | ... | ... |
| ... | ... | ... | ... | ... | ... | ... |
| CL-LIU E CARD | ... | ... | ... | ... | ... | ... |

FIG. 7

| UNUSED LINE ORDER | LINE |
|---|---|
| 1 | LINE L6 |
| 2 | LINE L8 |

FIG. 8

| LINE ORDER | PREDICTION TOTAL TRAFFIC VOLUME (LINE CANDIDATE) | | | |
|---|---|---|---|---|
| | PREDICTION TIME T1 | PREDICTION TIME T2 | PREDICTION TIME T3 | PREDICTION TIME T4 |
| 1 | A11 | A21 | A31 | A41 |
| 2 | A12 | A22 | B31 | B41 |
| 3 | B11 | B21 | B32 | C41 |
| 4 | D11 | B22 | C31 | E41 |
| 5 | E11 | D21 | A32 | C42 |
| 6 | B12 | E21 | E31 | B42 |
| 7 | A13 | B23 | D31 | A42 |
| 8 | C11 | C21 | B33 | D41 |
| 9 | | A23 | C32 | E42 |
| 10 | | | A33 | C43 |

FIG. 9

| LINE NUMBER | BAND INFORMATION | CARD USED IN CURRENT TIME | CARD USED IN PREDICTION TIME T1 | DEMAND OF LINE ALLOCATION |
|---|---|---|---|---|
| LINE L1 | STS3C(150 Mb) | CL-LIU A | CL-LIU A | NO |
| LINE L2 | STS3C(150 Mb) | CL-LIU A | CL-LIU A | NO |
| LINE L3 | STS3C(150 Mb) | CL-LIU A | CL-LIU A | NO |
| LINE L4 | STS3C(150 Mb) | CL-LIU B | CL-LIU B | NO |
| LINE L5 | STS3C(150 Mb) | CL-LIU D | CL-LIU D | NO |
| LINE L6 | STS3C(150 Mb) | CL-LIU D | CL-LIU B | YES |
| LINE L7 | STS3C(150 Mb) | CL-LIU E | CL-LIU E | NO |
| LINE L8 | STS3C(150 Mb) | CL-LIU E | CL-LIU C | YES |

| TRAFFIC MONITORING TIME | 10:19 |
|---|---|
| CL-LIU ID | CL-LIU A |
| ACTUALLY-MEASURED TRAFFIC VOLUME | 141 Mb |

FIG. 21

|  | YEAR 1 ||| ... | YEAR X |||
|---|---|---|---|---|---|---|---|
|  | JANUARY 1 (THURSDAY) | JANUARY 2 (FRIDAY) | JANUARY 5 (MONDAY) | ... | ... | ... | ... |
| WEEKDAY 08:00 | 370 Mb | 372 Mb | 365 Mb | ... | ... | ... | ... |

FIG. 32

| CLIENT | PREDICTION TIME | | | |
|---|---|---|---|---|
| | PREDICTION TIME T1 | PREDICTION TIME T2 | PREDICTION TIME T3 | PREDICTION TIME T4 |
| CL-LIU A | A11, A12, A13 | A21, A22, A23 | A31, A32, A33 | A41, A42 |
| CL-LIU B | B11, B12 | B21, B22, B23 | B31, B32, B33 | B41, B42 |
| CL-LIU C | C11 | C21 | C31, C32 | C41, C42, C43 |
| CL-LIU D | D11 | D21 | D31 | D41 |
| CL-LIU E | E11 | E21 | E31 | E41, E42 |

| TIME | PREDICTION TIME T1 |
|---|---|
| LINE NUMBER | LINE L6 |
| LINE ALLOCATION EXECUTION | EXECUTED |
| CARD USED IN CURRENT TIME | CL-LIU D |
| CARD TO BE USED IN PREDICTION TIME T1 | CL-LIU B |

FIG. 37

| LINE ORDER | LINE CANDIDATE | SUMMED PREDICTION TOTAL TRAFFIC VOLUME |
|---|---|---|
| 1 | A11 | A11+A21+A31+A41 |
| 2 | B11 | B11+B21+B31+B41 |
| 3 | A12 | A12+A22+A32+A42 |
| 4 | B12 | B12+B22+B32+B42 |
| 5 | E11 | E11+E21+E31+E41 |
| 6 | D11 | D11+D21+D31+D41 |
| 7 | C11 | C11+C21+C31+C41 |
| 8 | A13 | A13+A23+A33 |

TRANSMISSION DEVICE, CONTROL CARD, AND TRANSMISSION METHOD

CROSS-REFERENCE TO RELATED APPLICATION

This application is based upon and claims the benefit of priority of the prior Japanese Patent Application No. 2013-057378, filed on Mar. 19, 2013, the entire contents of which are incorporated herein by reference.

FIELD

Embodiments discussed herein are related to a transmission device, a control card, and a transmission method.

BACKGROUND

Examples of a transmission device which builds a network include a synchronous optical network (SONET)-add drop multiplexer (ADM) transmission device, a packet transmission device, a wavelength division multiplex (WDM) transmission device, and the like. It is common that increase/decrease of the traffic volume is predicted and a band is allocated on the basis of the predicted increase/decrease of the traffic volume, in these transmission devices. On a network employing these transmission devices, when traffic exceeding prediction is generated, some terminals become to have difficulty in communication due to shortage of bands which are allocated to lines of the network. As a method for suppressing the number of terminals which have difficulty in communication, there is a method in which appropriate routing is performed on the basis of prediction of transition of the traffic.

For the prediction of transition of traffic, collected traffic data are accumulated and a periodic variation pattern of one year, one month, one day, or the like, a variation pattern in an occurrence of various types of events such as an earthquake and a concert, and the like may be used, for example. Transition of traffic is predicted by using these variation patterns so as to perform appropriate routing. Further, a variation pattern representing a long-term trend, a periodic variation pattern, and a variation pattern in an occurrence of an event may be combined with each other so as to generate and use a new traffic variation pattern.

Japanese Laid-open Patent Publication No. 2007-116648 is an example of related art.

SUMMARY

According to an aspect of the invention, a transmission device includes: a calculation unit configured to detect abnormal traffic of a route based on a traffic volume collected for the route and to calculate a traffic increase or decrease time that is a difference of a current time and a traffic increase or decrease start time, respectively, and a traffic increase or decrease volume that is a difference of an actually-measured traffic volume at the current time and an actually-measured traffic volume at the traffic increase or decrease start time, respectively, of the abnormal traffic; a normal prediction graph generation unit configured to generate a normal prediction graph of the route based on the traffic volume in normal time in which the abnormal traffic is not detected; a prediction graph generation unit configured to generate an abnormal prediction graph based on the traffic increase or decrease time and the traffic increase or decrease volume of the abnormal traffic in detection of the abnormal traffic; an order determination unit configured to determine a line order that is a priority order of line allocation for the route based on the normal prediction graph or the abnormal prediction graph of the route; and an optimization unit configured to determine lines that are to be allocated to the route based on the line order.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of a statistics traffic DB;

FIG. 4 illustrates an example of a normal prediction graph DB;

FIG. 5 illustrates an example of a prediction graph DB;

FIG. 6 illustrates an example of a prediction traffic volume DB;

FIG. 7 illustrates an example of an unused line order in a priority order DB;

FIG. 8 illustrates an example of a line order in the priority order DB;

FIG. 9 illustrates an example of a line information DB;

FIG. 21 illustrates an example of statistics traffic data;

FIG. 32 illustrates an example of a prediction total traffic volume with respect to prediction time of each CL-LIU card;

FIG. 37 illustrates another example of a line order in the priority order DB.

DESCRIPTION OF EMBODIMENTS

In the traffic transition prediction using a variation pattern in an occurrence of an event, it is possible to predict traffic variation when an event occurs on one place. However, a case in which events simultaneously occur on a plurality of regions is not assumed and it is difficult to predict traffic variation in this traffic transition prediction. Accordingly, when events simultaneously occur on a plurality of regions, transmission devices which correspond to respective regions scramble for mutual bands in a short period of time, generating fluctuation of band allocation.

Hereinafter, embodiments of a transmission device, a control card, a transmission method, and a transmission program that enable suppression of an occurrence of fluctuation in band allocation even when abnormal traffic occurs in a plurality of places are described in detail with reference to the accompanying drawings. Here, the embodiments described below do not limit embodiments of the present disclosure. Further, the embodiments below may be arbitrarily combined with each other within a consistent scope.

First Embodiment

Figure 1:
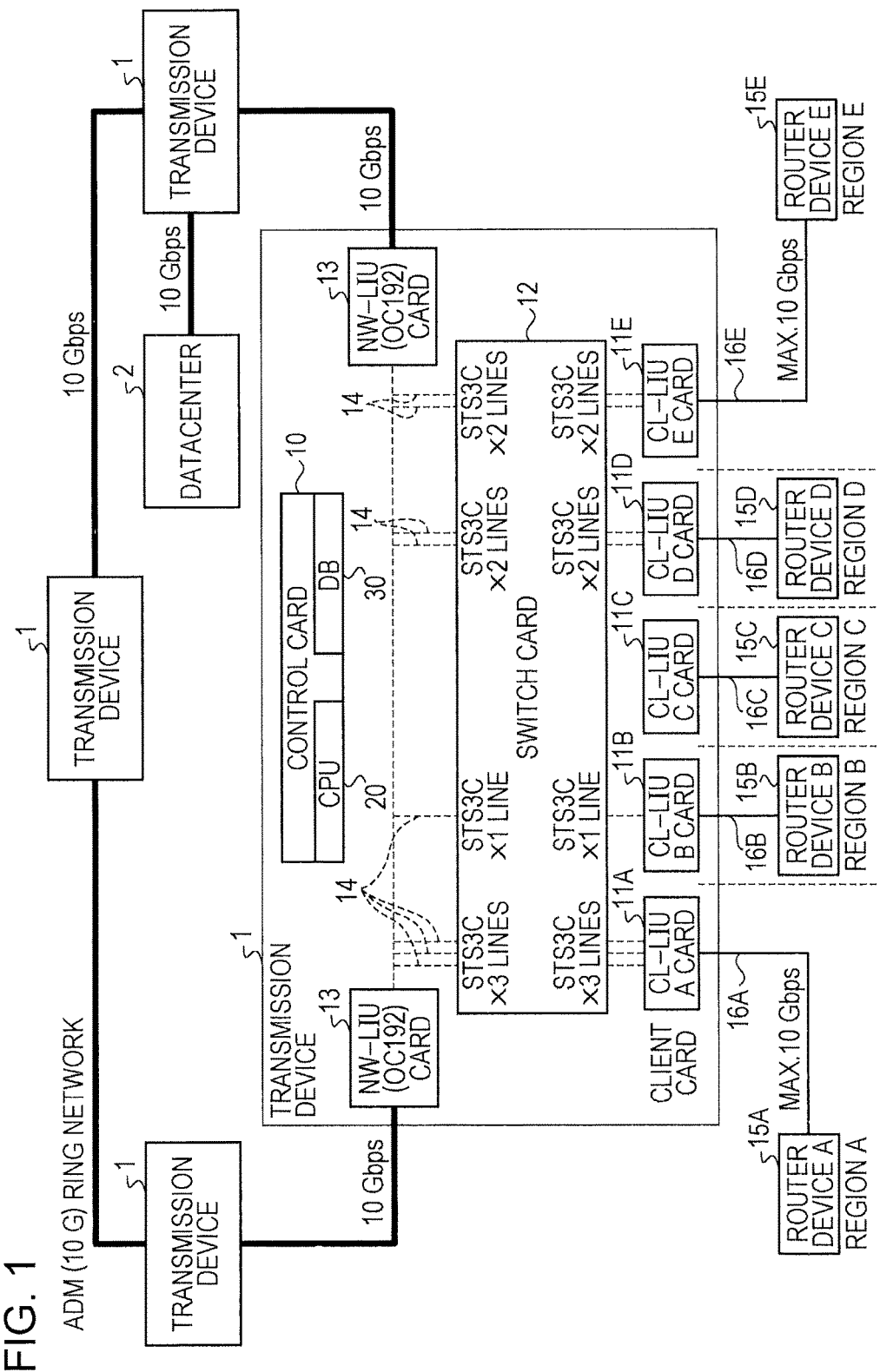
FIG. 1 illustrates an example of the whole configuration of a network according to an embodiment.

FIG. 1 illustrates an example of the whole configuration of a network according to an embodiment. A network depicted in FIG. 1 is configured by connecting transmission devices 1 by an ADM ring network. A datacenter 2 is connected to one of the transmission devices 1. Here, a transmission speed of a backbone network which is a ring network in which the transmission devices 1 are circularly connected is 10 Gbps, for example.

The transmission device 1 is described below by taking one transmission device 1 as an example as depicted in FIG. 1. To the transmission device 1, router devices 15A to 15E which are respectively arranged in regions A to E are connected. The router device 15A is connected with a client-line interface unit (CL-LIU) card 11A, which will be described later, of the transmission device 1 via a route 16A on a one-to-one basis. In a similar manner, the router devices 15B to 15E are respectively connected with CL-LIU cards 11B to 11E via routes 16B to 16E on the one-to-one basis.

The transmission device 1 includes a control card 10, the CL-LIU cards 11A to 11E, a switch card 12, and network-line interface unit (NW-LIU) cards 13. Further, the switch card 12 arbitrarily allocates logical lines 14 (hereinafter, referred to merely as lines) so as to couple the NW-LIU cards 13 with the CL-LIU cards 11A to 11E in a switching manner.

The datacenter 2 is a mail server, a web server, or the like, for example, and is accessed from respective terminal devices of the regions A to E via a network. The datacenter 2 transmits/receives traffic data of respective terminal devices via the network.

The control card 10 includes a central processing unit (CPU) 20 and a database (DB) 30. Further, the control card 10 includes a storage unit which is not depicted and the DB 30 is stored in the storage unit. Further, the control card 10 is connected with the CL-LIU cards 11A to 11E, the switch card 12, and the NW-LIU cards 13 and 13 via an interface, which is not depicted, and controls respective cards. That is, the control card 10 includes the CPU 20, the storage unit, and the interface as the hardware configuration.

Figure 2:
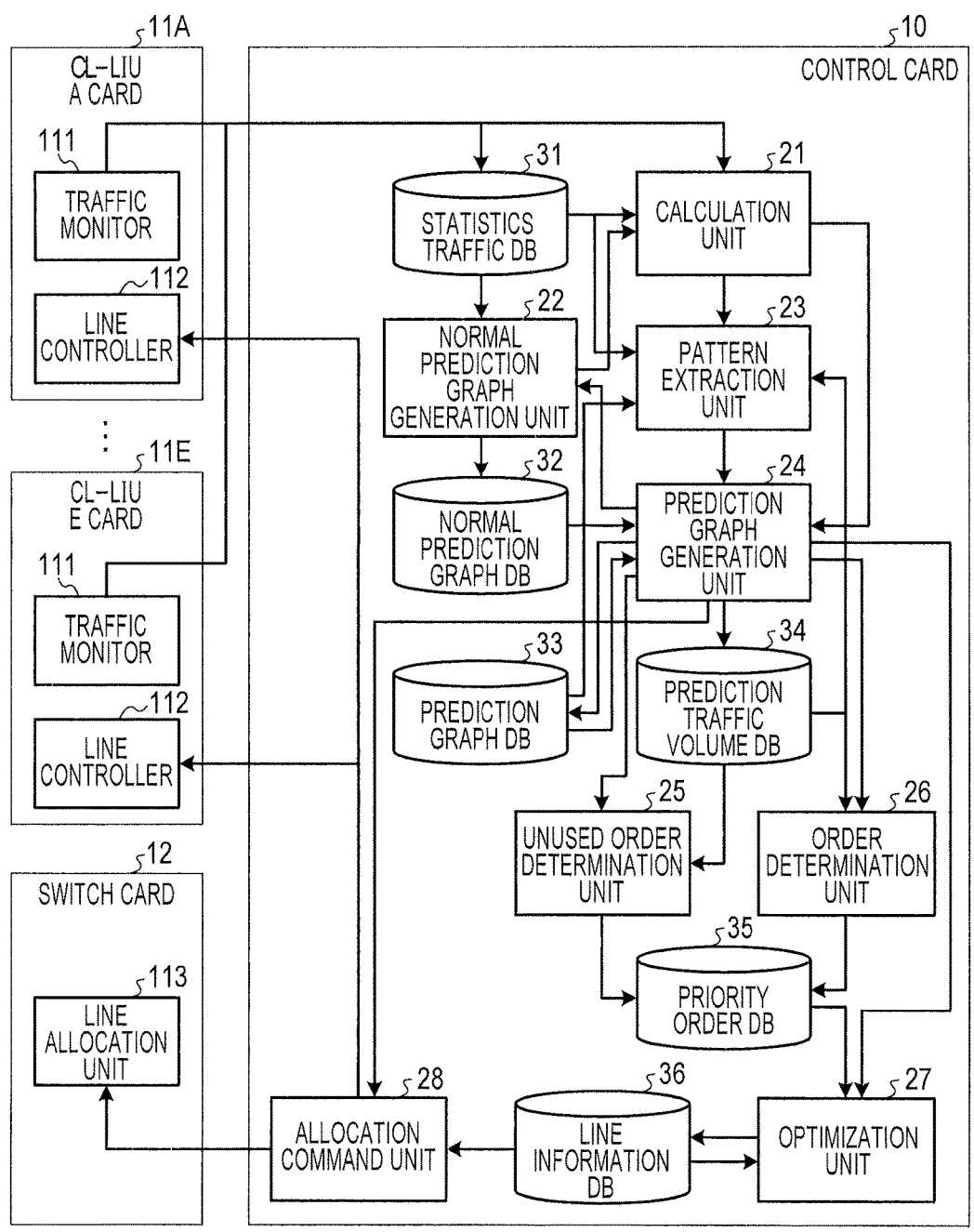
FIG. 2 is a block diagram illustrating an example of the configuration of a transmission device of the embodiment.

FIG. 2 is a block diagram illustrating an example of the configuration of the transmission device according to the embodiment. The CPU 20 of the control card 10 executes functions which are various types of processes on the basis of a program which is stored in the storage unit which is not depicted.

Each of the CL-LIU cards 11A to 11E includes a traffic monitor 111 and a line controller 112. The CL-LIU cards 11A to 11E transmit/receive data to and from the router devices 15A to 15E via the routes 16A to 16E respectively. The traffic monitor 111 regularly collects traffic volumes of data which is transmitted/received to and from the corresponding router devices 15A to 15E. Further, the traffic monitor 111 transmits the collected traffic volumes to the control card 10. The line controller 112 allocates the lines 14 to the routes 16 (16A to 16E) on the basis of an allocation command message of the control card 10.

The switch card 12 includes a line allocation unit 113. The line allocation unit 113 switches the lines 14 between the NW-LIU cards 13 and the CL-LIU cards 11A to 11E on the basis of an allocation command message of the control card 10.

The NW-LIU card 13 is an interface, which is connected with another transmission device 1, of the network and is connected with a NW-LIU card 13 of another transmission device 1 so as to transmit/receive data.

The lines 14 are logical lines (shared bands) which are arbitrarily allocated by the switch card 12 between the NW-LIU cards 13 and the CL-LIU cards 11A to 11E. The lines 14 are composed of eight logical lines, for example. The line 14 corresponds to a synchronous transport signal 3, concatenated (STS3C) for which the maximum traffic volume of one logical line is 150 Mbit (hereinafter, described as Mb). For the sake of convenience of the description, when eight logical lines of the lines 14 are discriminated from each other, the logical lines are denoted as lines L1 to L8.

The router devices 15A to 15E are arranged respectively in the regions A to E and store respective terminal devices of the corresponding regions. Further, the router devices 15A to 15E are respectively connected with the CL-LIU cards 11A to 11E of the transmission device 1 via the routes 16A to 16E on the one-to-one basis.

The routes 16A to 16E are physical lines which connect the CL-LIU cards 11A to 11E of the transmission device 1 with the router devices 15A to 15E respectively. Further, the maximum transmission speed of the routes 16A to 16E is 10 Gbps, for example. Here, in the following description of an operation in the control card 10, the operation is described by using the CL-LIU cards 11A to 11E which are connected with the routes 16A to 16E on the one-to-one basis, instead of the routes 16A to 16E which are physical lines.

The control card 10 depicted in FIG. 2 includes a calculation unit 21, a normal prediction graph generation unit 22, a pattern extraction unit 23, a prediction graph generation unit 24, an unused order determination unit 25, an order determination unit 26, an optimization unit 27, and an allocation command unit 28. The DB 30 of the control card 10 includes a statistics traffic DB 31, a normal prediction graph DB 32, a prediction graph DB 33, a prediction traffic volume DB 34, a priority order DB 35, and a line information DB 36.

The calculation unit 21 receives traffic volumes which are collected by the traffic monitors 111 in the CL-LIU cards 11A to 11E. The calculation unit 21 detects a case in which the received traffic volume is equal to or larger than an upper limit traffic volume which is an upper limit of the traffic volume in normal time or the received traffic volume is smaller than a lower limit traffic volume which is a lower limit of the traffic volume in normal time, as abnormal traffic. Here, a traffic volume which is preliminarily stored in the statistics traffic DB 31 or a traffic volume which is generated on the basis of a normal prediction graph which is generated in the normal prediction graph generation unit 22 may be used as the traffic volume in normal time. When the calculation unit 21 does not detect abnormal traffic, the calculation unit 21 regularly transmits information representing the normal traffic to the prediction graph generation unit 24.

Further, when the calculation unit 21 detects the abnormal traffic, the calculation unit 21 calculates traffic increase/decrease time and a traffic increase/decrease volume of the abnormal traffic. Here, the traffic increase/decrease time and the traffic increase/decrease volume are collectively referred to as an increase/decrease parameter. The calculation unit 21 transmits the increase/decrease parameter of the abnormal traffic to the pattern extraction unit 23.

The normal prediction graph generation unit 22 generates a normal prediction graph of each CL-LIU card 11 on the basis of the traffic volume, which is stored in the statistics traffic DB 31, for normal time in which the abnormal traffic is not detected. A normal prediction graph has an average traffic volume, an upper limit traffic volume, and a lower limit traffic volume as parameters. The normal prediction graph generation unit 22 calculates these three types of parameters by the unit of one minute for 24 hours once in a day, for example, and stores the parameters in the normal prediction graph DB 32. Further, a normal prediction graph is arbitrarily generated in accordance with characteristics of traffic such as a weekday, Saturday, and Sunday/holiday. Here, the normal prediction graph generation unit 22 generates a normal prediction graph and stores the normal prediction graph in the normal prediction graph DB 32 in a case in which generation of a normal prediction graph is instructed by the prediction graph generation unit 24, as well.

The pattern extraction unit 23 receives an increase/decrease parameter of abnormal traffic which is calculated in the calculation unit 21. Further, the pattern extraction unit 23 receives a current prediction traffic volume from the prediction traffic volume DB 34. The pattern extraction unit 23 determines whether or not to newly generate an abnormal prediction graph on the basis of the increase/decrease parameter of the abnormal traffic. When the pattern extraction unit 23 newly generates an abnormal prediction graph, the pattern extraction unit 23 obtains increase/decrease parameters of patterns which are identical or similar to the increase/decrease parameter of the abnormal traffic, from the statistics traffic DB 31. The pattern extraction unit 23 extracts one or more increase/decrease parameters of the similar patterns from the obtained increase/decrease parameters of the identical or similar patterns.

The pattern extraction unit 23 transmits the extracted increase/decrease parameters of the similar patterns to the prediction graph generation unit 24. Further, when the pattern extraction unit 23 continuously uses a current prediction graph and when the pattern extraction unit 23 fails to extract an increase/decrease parameter of a similar pattern, the pattern extraction unit 23 transmits information representing the continuous use and information representing the fail of extraction to the prediction graph generation unit 24.

When the prediction graph generation unit 24 receives the information representing the continuous use of the current prediction graph from the pattern extraction unit 23, the prediction graph generation unit 24 extracts the current prediction graph from the prediction graph DB 33 and supplies only shortfalls so as to store the prediction graph in the prediction graph DB 33. Further, when the prediction graph generation unit 24 receives an increase/decrease parameter of a similar pattern from the pattern extraction unit 23, the prediction graph generation unit 24 generates an abnormal prediction graph on the basis of the increase/decrease parameter. The prediction graph generation unit 24 stores the generated abnormal prediction graph in the prediction graph DB 33. Here, when the prediction graph generation unit 24 receives information representing the fail of extraction of an increase/decrease pattern, the prediction graph generation unit 24 discards the current prediction graph without generating an abnormal prediction graph, and transmits information representing that line allocation processing is executed in equal probability, to the optimization unit 27. When the prediction graph generation unit 24 determines that a normal prediction graph has not been generated within 24 hours, the prediction graph generation unit 24 instructs the normal prediction graph generation unit 22 to generate a normal prediction graph. When the prediction graph generation unit 24 receives information representing normal traffic from the calculation unit 21, the prediction graph generation unit 24 extracts a normal prediction graph from the normal prediction graph DB 32 and stores the normal prediction graph in the prediction graph DB 33.

The prediction graph generation unit 24 calculates a prediction total traffic volume and a prediction unused total traffic volume on the basis of a normal prediction graph or an abnormal prediction graph (hereinafter, referred to merely as a prediction graph when a normal prediction graph and an abnormal prediction graph are not discriminated from each other) which is stored in the prediction graph DB 33. Here, the prediction total traffic volume represents the traffic volume for each capacity of the lines 14 in the latest prediction time, and the prediction unused total traffic volume represents a traffic volume which is obtained by deducting the prediction total traffic volume from the capacity of the line 14. Further, the prediction time represents a period of time in which a prediction graph is generated. The prediction time is the shortest time in which lines are able to be allocated and is set to 10 minutes, for example. Here, the prediction time is not limited to 10 minutes but may be set to arbitrary time. The prediction graph generation unit 24 stores the calculated prediction total traffic volume and the calculated prediction unused total traffic volume in the prediction traffic volume DB 34.

When the prediction graph generation unit 24 generates prediction graphs for the CL-LIU cards 11A to 11E, the prediction graph generation unit 24 determines whether or not a new line 14 is demanded other than the lines 14 which are currently allocated to the CL-LIU cards 11A to 11E, respectively. When a new line 14 is not demanded in each of the CL-LIU cards 11, the prediction graph generation unit 24 ends the processing without executing line allocation.

When there is one or more CL-LIU cards 11 which demand a new line 14, the prediction graph generation unit 24 determines whether or not a new allocation order is demanded on the basis of current and past prediction graphs. When a new allocation order is demanded, the prediction graph generation unit 24 transmits information representing the demand of order determination to the unused order determination unit 25 and the order determination unit 26. When a new allocation order is not demanded, the prediction graph generation unit 24 transmits information representing that an allocation order which is currently used is employed to the allocation command unit 28.

When the unused order determination unit 25 receives the information representing the demand of the order determination from the prediction graph generation unit 24, the unused order determination unit 25 acquires the prediction unused total traffic volumes of respective CL-LIU cards 11 from the prediction traffic volume DB 34. When unused lines 14 are present in the latest prediction time in prediction graphs of respective CL-LIU cards 11 among the lines 14, the unused order determination unit 25 determines the number of unused lines 14.

Further, the unused order determination unit 25 determines an unused line order for allocating the unused lines 14 to respective CL-LIU cards 11 having shortage of the lines 14, on the basis of the prediction graphs of respective CL-LIU cards 11 and the number of unused lines 14. The unused order determination unit 25 stores the determined number of unused lines and the determined unused line order in the priority order DB 35.

When the order determination unit 26 receives the information representing the demand of the order determination from the prediction graph generation unit 24, the order determination unit 26 acquires prediction total traffic volumes in all periods of prediction time of each CL-LIU card 11, from the prediction traffic volume DB 34. The order determination unit 26 sets line candidates to be line-allocated for the route on the basis of the prediction total traffic volumes of respective lines 14 in respective periods of prediction time, in the prediction graphs of respective CL-LIU cards 11. The order determination unit 26 determines a line order by arranging a line order which is a priority order of line candidates in a descending order of the prediction total traffic volume.

Further, when there are line candidates of same prediction total traffic volumes, the order determination unit 26 raises a line order of a line candidate of a CL-LIU card 11, to which a line candidate whose line order has been higher in the preceding prediction time belongs, so as to determine a line order. That is, a line 14 is preferentially allocated to a CL-LIU card 11 to which a line candidate with a higher line order belongs. The order determination unit 26 stores the determined line order in the priority order DB 35.

The optimization unit 27 acquires a line order, the number of unused lines, and an unused line order from the priority order DB 35 and acquires current line information from the line information DB 36. The optimization unit 27 determines lines 14 (line L1 to line L8) which are to be allocated to respective CL-LIU cards 11, on the basis of the line order, the number of unused lines, and the unused line order.

In a case in which there are unused lines and CL-LIU cards 11 which demand allocation of lines 14 are present, the optimization unit 27 stores line information representing that the unused lines are allocated to the corresponding CL-LIU cards 11 on the basis of the number of unused lines and the unused line order, in the line information DB 36.

Further, when there is no unused line and CL-LIU cards 11 which demand allocation of lines 14 are present, the optimization unit 27 stores new line information in the line information DB 36. New line information is line information representing that a line 14 of a low line order is allocated to a CL-LIU card 11 to which a line candidate of a high line order belongs, among the lines 14 (line L1 to line L8) which are in use. When the optimization unit 27 receives information representing that the line allocation processing is executed in equal probability from the prediction graph generation unit 24, the optimization unit 27 stores line information, which represents that unused lines are allocated to CL-LIU cards 11 which are objects of the line allocation processing in equal probability, in the line information DB 36.

The allocation command unit 28 acquires line information from the line information DB 36 in every period of prediction time. When the line allocation processing is demanded, the allocation command unit 28 transmits an allocation command message to the line controller 112 of the corresponding CL-LIU card 11 and the line allocation unit 113 of the switch card 12, on the basis of the line information. Here, when the allocation command unit 28 receives information representing the use of a currently-used allocation order from the prediction graph generation unit 24, the allocation command unit 28 does not transmit an allocation command message but continuously employs line allocation same as that of the current prediction time in the following prediction time in accordance with the information.

The statistics traffic DB 31 receives and stores traffic volumes collected from the traffic monitors 111 of the CL-LIU cards 11A to 11E. That is, traffic volumes which are collected for respective routes 16 are accumulated as statistics data in the statistics traffic DB 31.

FIG. 3 illustrates an example of a statistics traffic DB. In the statistics traffic DB 31, date information, information of the CL-LIU card 11, and statistics traffic data for 24 hours per day are stored in an associated manner. Here, the date information includes not only dates but also information of the day of the week and whether it is a holiday. Further, the statistics traffic data for 24 hours per day is the traffic volume which is collected on a minute-by-minute basis through 24 hours, that is, the traffic volume per minute from 00:00 to 23:59.

The normal prediction graph DB 32 stores a normal prediction graph of each CL-LIU card 11 which is generated in the normal prediction graph generation unit 22. FIG. 4 illustrates an example of a normal prediction graph DB. The normal prediction graph DB 32 is categorized into a weekday, Saturday, and Sunday/holiday for every CL-LIU card 11 and each category includes an average traffic volume, an upper limit traffic volume, and a lower limit traffic volume as parameters. Further, each of the average traffic volume, the upper limit traffic volume, and the lower limit traffic volume is composed of the prediction traffic volumes per minute in 24 hours. Here, categories of a weekday, Saturday, and Sunday/holiday may be arbitrarily changed.

When a normal prediction graph is used, the prediction graph DB 33 stores a normal prediction graph of each CL-LIU card 11 which is acquired from the normal prediction graph DB 32 by the prediction graph generation unit 24. When a current prediction graph is continuously used, the prediction graph DB 33 supplies only shortfalls with respect to the current prediction graph and stores the normal prediction graph of each CL-LIU card 11. When the prediction graph generation unit 24 generates an abnormal prediction graph of each CL-LIU card 11, the prediction graph DB 33 stores the generated abnormal prediction graph. FIG. 5 illustrates an example of a prediction graph DB. The prediction graph DB 33 stores prediction traffic volumes of respective CL-LIU cards 11 per minute for 24 hours from current time. Further, the prediction graph DB 33 stores a past prediction graph such as a prediction graph of preceding prediction time, as well, for determination of an allocation order.

The prediction traffic volume DB 34 stores the prediction total traffic volume and the prediction unused total traffic volume which are generated in the prediction graph generation unit 24. FIG. 6 illustrates an example of a prediction traffic volume DB. The prediction traffic volume DB 34 stores a prediction total traffic volume and a prediction unused total traffic volume for each CL-LIU card 11. Further, the prediction traffic volume DB 34 stores the traffic volumes of all periods of prediction time (prediction time T1 to prediction time T4) for respective lines L1 to L8 as the prediction total traffic volume and the prediction unused total traffic volume. Here, though each traffic volume is denoted as a reference character such as all in FIG. 6, a prediction total traffic volume or a prediction unused total traffic volume which is calculated by the prediction graph generation unit 24 is stored in practice.

The priority order DB 35 stores the number of unused lines and an unused line order that are determined in the unused order determination unit 25 and a line order which is determined in the order determination unit 26. FIG. 7 illustrates an example of an unused line order in a priority order DB. In the example of FIG. 7, only records corresponding to the number (two) of unused lines are provided and the line L6 and the line L8 which are unused lines are stored. FIG. 8 illustrates an example of a line order in the priority order DB. The priority order DB 35 stores line candidates (A11 and the like in FIG. 8) which demand the line L1 to the line L8 for all periods of prediction time, in accordance with the line order.

The line information DB 36 stores line information which is generated by the optimization unit 27. FIG. 9 illustrates an example of a line information DB. The line information DB 36 stores band information, a CL-LIU card 11 which is used in current time, a CL-LIU card 11 which is used in prediction time T1, and demand of line allocation in prediction time T1, for each of the line L1 to the line L8.

Figure 10:
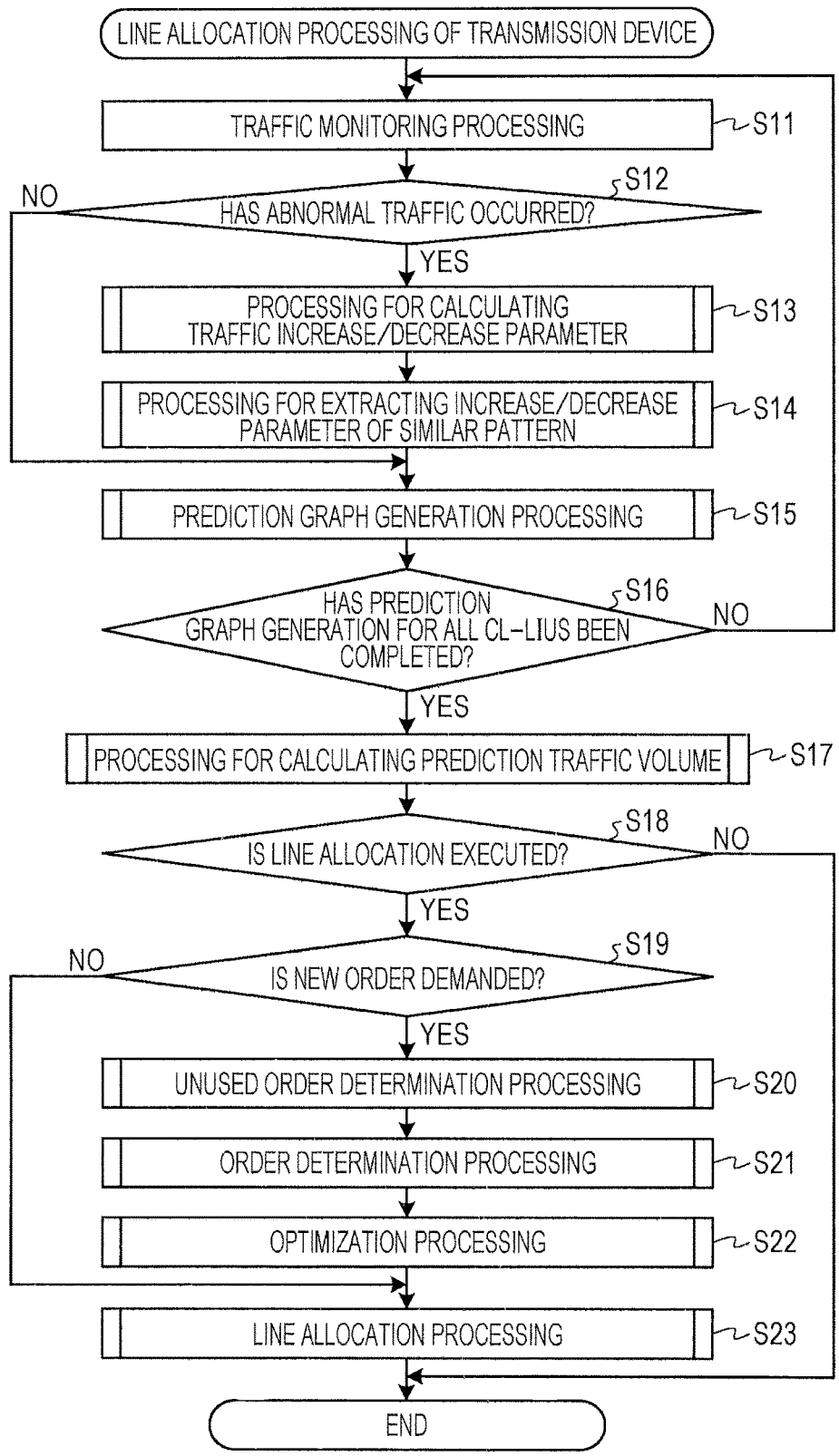
FIG. 10 is a flowchart illustrating an example of line allocation processing of the transmission device in the embodiment.

An operation of the transmission device according to the first embodiment is now described. FIG. 10 is a flowchart illustrating an example of line allocation processing of the transmission device in the embodiment. For the sake of convenience of the description, a flow of the line allocation processing is first described and description of processing which is better to be described in detail will be provided later.

[Traffic Monitoring Processing]

The traffic monitor 111 of each CL-LIU card 11 monitors and collects traffic volumes of the routes 16 to which respective CL-LIU cards 11 are connected, so as to transmit the collected traffic volumes to the control card 10 on a minute-by-minute basis (operation S11).

[Abnormal Traffic Detection Processing]

The calculation unit 21 of the control card 10 determines whether or not abnormal traffic has occurred at prediction graph generation time, that is, every 10 minutes (operation S12). When a received traffic volume is equal to or larger than the upper limit traffic volume or smaller than the lower limit traffic volume (positive in operation S12), the calculation unit 21 detects the case as abnormal traffic. Further, when abnormal traffic is not detected (negative in operation S12), that is, when normal traffic is detected, the calculation unit 21 goes to prediction graph generation processing of operation S15. Here, the calculation unit 21 may arbitrarily change timing of determination of whether abnormal traffic has occurred, such as timing of a minute-by-minute basis.

[Processing for Calculating Increase/Decrease Parameter of Abnormal Traffic]

When abnormal traffic is detected in operation S12, the calculation unit 21 calculates traffic increase/decrease time and a traffic increase/decrease volume as an increase/decrease parameter of the abnormal traffic (operation S13).

[Processing for Extracting Increase/Decrease Parameter of Similar Pattern]

The pattern extraction unit 23 determines whether or not to newly generate an abnormal prediction graph, on the basis of an increase/decrease parameter of the abnormal traffic. When the pattern extraction unit 23 newly generates an abnormal prediction graph, the pattern extraction unit 23 obtains increase/decrease parameters of patterns identical to or similar to the increase/decrease parameter of the abnormal traffic, from the statistics traffic DB 31. The pattern extraction unit 23 extracts one or more of the obtained increase/decrease parameters of the identical or similar patterns as increase/decrease parameters of the similar patterns (operation S14). Further, when the pattern extraction unit 23 does not newly generate an abnormal prediction graph but continuously uses a current prediction graph and when the pattern extraction unit 23 fails to extract increase/decrease parameters of similar patterns, the pattern extraction unit 23 generates information representing the continuous use and information representing the fail of extraction.

[Prediction Graph Generation Processing]

When one or more increase/decrease parameters of similar patterns are extracted in operation S14, the prediction graph generation unit 24 generates an abnormal prediction graph on the basis of the increase/decrease parameters. When abnormal traffic is not detected in operation S12, that is, when it is determined as normal traffic, the prediction graph generation unit 24 extracts a normal prediction graph from the normal prediction graph DB 32. The prediction graph generation unit 24 stores the abnormal prediction graph or the normal prediction graph in the prediction graph DB 33 (operation S15). When extraction of an increase/decrease parameter is failed in operation S14, the prediction graph generation unit 24 discards a current prediction graph without generating an abnormal prediction graph and transmits information representing that line allocation processing is performed in equal probability to the optimization unit 27.

The control card 10 determines whether or not processing from operation S11 to operation S15 has been executed for all of the CL-LIU cards 11A to 11E (operation S16). When the processing from operation S11 to the operation S15 has not been executed for all of the CL-LIU cards 11 (negative in operation S16), the processing returns to operation S11. When the processing from operation S11 to the operation S15 has been executed for all of the CL-LIU cards 11 (positive in operation S16), the processing goes to processing for calculating a prediction traffic volume.

[Processing for Calculating Prediction Traffic Volume]

The prediction graph generation unit 24 calculates a prediction total traffic volume and a prediction unused total traffic volume of the lines 14 which are allocated at current time for each of the CL-LIU cards 11 on the basis of a prediction graph which is stored in the prediction graph DB 33 (operation S17).

[Processing for Determining Demand for Line Allocation]

The prediction graph generation unit 24 determines whether or not a new line 14 is demanded in each of the CL-LIU cards 11 (operation S18). When a new line 14 is not demanded in each of the CL-LIU cards 11 (negative in operation S18), the prediction graph generation unit 24 ends the processing without executing the line allocation. When one or more CL-LIU cards 11 which demand a new line 14 are present (positive in operation S18), the prediction graph generation unit 24 goes to processing for determining demand for a new allocation order.

[Processing for Determining Demand for New Allocation Order]

The prediction graph generation unit 24 determines whether or not a new allocation order is demanded on the basis of current and past prediction graphs (operation S19). When a new allocation order is demanded (positive in operation S19), the prediction graph generation unit 24 transmits information representing the demand of order determination to the unused order determination unit 25 and the order determination unit 26. When a new allocation order is not demanded (negative in operation S19), the prediction graph generation unit 24 transmits information representing employment of a currently-used allocation order to the allocation command unit 28.

[Unused Order Determination Processing]

When there are unused lines 14 among the lines 14 in the latest prediction time in the prediction graphs of respective CL-LIU cards 11, the unused order determination unit 25 determines the number of unused lines 14. Further, the unused order determination unit 25 determines an unused line order for allocating the unused lines 14 to the CL-LIU cards 11 having deficiency of lines 14, on the basis of the prediction graphs of respective CL-LIU cards 11 and the number of unused lines. The unused order determination unit 25 stores the determined number of unused lines and the determined unused line order in the priority order DB 35 (operation S20).

[Order Determination Processing]

The order determination unit 26 sets line candidates to be line-allocated for the route on the basis of prediction total traffic volumes of the lines 14 in respective periods of prediction time, in the prediction graphs of respective CL-LIU cards 11. The order determination unit 26 determines a line order by arranging the line order of line candidates in a descending order of the prediction total traffic volume and stores the determined line order in the priority order DB 35 (operation S21).

[Optimization Processing]

The optimization unit 27 determines lines 14 which are to be allocated to respective CL-LIU cards 11 on the basis of a line order, the number of unused lines, and an unused line order that are stored in the priority order DB 35. When there are unused lines and CL-LIU cards 11 demanding allocation of lines 14 are present, the optimization unit 27 stores line information representing that the unused lines are allocated to the CL-LIU cards 11, on the basis of the number of unused lines and the unused line order, in the line information DB 36. Further, when there is no unused lines and CL-LIU cards 11 demanding allocation of lines 14 are present, the optimization unit 27 stores line information representing that lines 14 in use are to be allocated to the CL-LIU cards 11, in the line information DB 36 (operation S22). That is, the optimization unit 27 stores line information representing that a line 14 of a low line order among lines 14 which are in use is allocated to a CL-LIU card 11 to which a line candidate of a high line order belongs, in the line information DB 36.

[Line Allocation Processing]

The allocation command unit 28 acquires line information from the line information DB 36 for every period of prediction time. When the line allocation processing is demanded in accordance with the line information, the allocation command unit 28 transmits an allocation command message to the line controller 112 of the corresponding CL-LIU cards 11 and the line allocation unit 113 of the switch card 12. The allocation command unit 28 transmits the allocation command message at timing of the next prediction time, that is, timing of prediction graph generation time (operation S23). The line controller 112 and the line allocation unit 113 allocate lines 14 in accordance with the allocation command message and the line allocation processing of the transmission device 1 is ended.

Subsequently, each processing in the line allocation processing of the transmission device 1 according to the first embodiment is described in detail.

[Traffic Monitoring Processing (Operation S11)]

The traffic monitors 111 of respective CL-LIU cards 11 monitor and collect traffic volumes in the uplink direction of the routes 16 to which respective CL-LIU cards 11 are connected. Here, the uplink direction represents a direction from the client side to the backbone network side. In the transmission device 1, the uplink direction is a direction from the CL-LIU card 11 to the NW-LIU card 13. Further, the traffic volume collected by the traffic monitor 111 is an actually-measured traffic volume which is obtained by accumulating all traffic in traffic monitoring time which is set to one minute, for example. The actually-measured traffic volume includes traffic which overflows from a buffer in the CL-LIU card 11 to be missing.

Figures 11, 12:
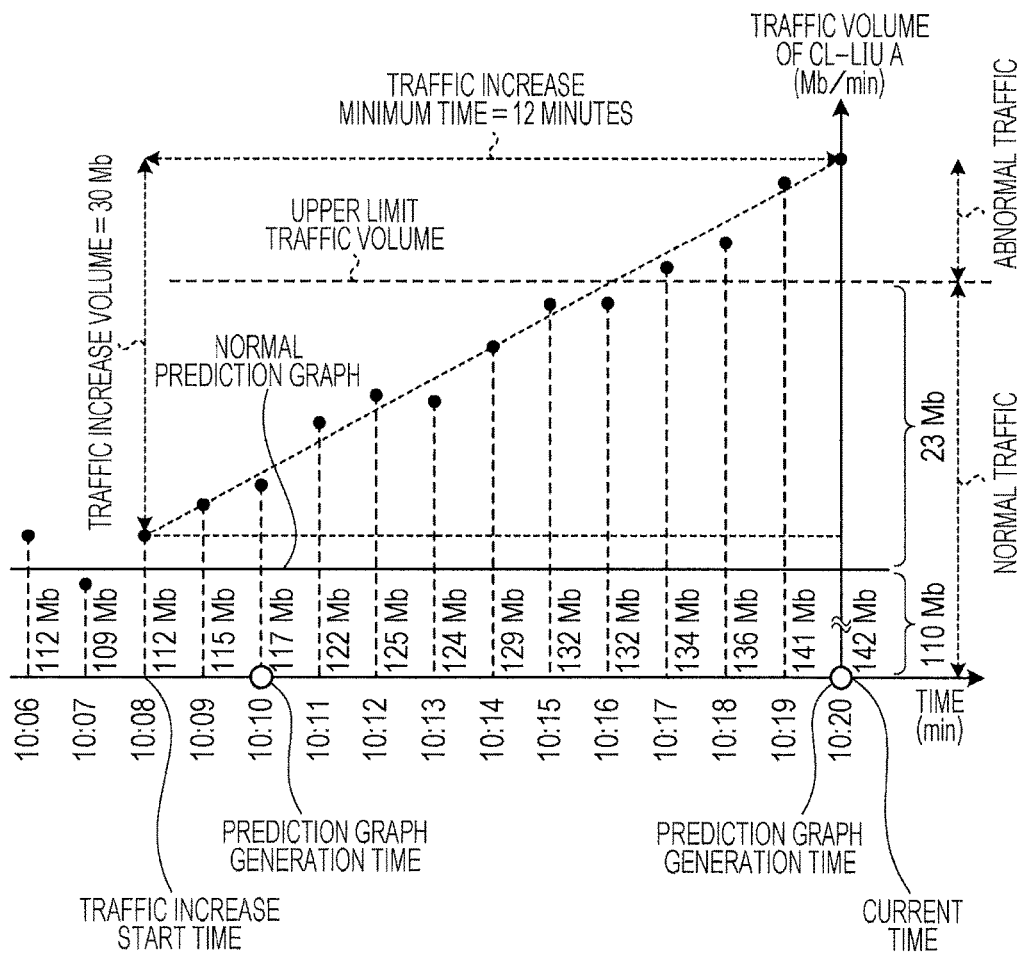
FIG. 11 illustrates an example of an actually-measured traffic message.
FIG. 12 illustrates an example of an abnormal traffic detection method (increase)

FIG. 11 illustrates an example of an actually-measured traffic message. The traffic monitor 111 transmits the collected traffic volume to the calculation unit 21 and the statistics traffic DB 31 as an actually-measured traffic message depicted in FIG. 11. In the example of FIG. 11, an actually-measured traffic message includes traffic monitoring time, an ID of the CL-LIU card 11, and an actually-measured traffic volume. In the statistics traffic DB 31, actually-measured traffic volumes of respective periods of traffic monitoring time are accumulated for respective CL-LIU cards 11, on the basis of the received actually-measured traffic message. According to the traffic monitoring processing, it is possible to monitor traffic volumes in the uplink direction of respective routes 16 and collect traffic monitoring time, IDs of the CL-LIU cards 11, and actually-measured traffic volumes.

[Abnormal Traffic Detection Processing (Operation S12)]

When the received traffic volume is equal to or larger than the upper limit traffic volume or smaller than the lower limit traffic volume, the calculation unit 21 detects abnormal traffic. FIG. 12 illustrates an example of a method for detecting abnormal traffic (increase). In a graph of FIG. 12, a horizontal axis represents time (min) and a vertical axis represents the traffic volume (Mb/min) of the CL-LIU card 11A. In the graph of FIG. 12, current time is 10:20, for example. Further, in the graph of FIG. 12, filled circles denote actually-measured traffic volumes per minute from 10:06 to 10:20. Further, 10:10 and 10:20 are prediction graph generation time and thus, detection of abnormal traffic is performed every 10 minutes.

A normal prediction graph of the graph of FIG. 12 is a graph in which the traffic volume stays on 110 Mb, and the upper limit traffic volume is represented by a graph in which the traffic volume stays on 133 Mb which is obtained by adding 23 Mb to the normal prediction graph.

The calculation unit 21 determines the actually-measured traffic volumes (filled circles) which are depicted between the normal prediction graph and the upper limit traffic volume in the graph of FIG. 12, as normal traffic which is traffic in normal time. Further, the calculation unit 21 determines the actually-measured traffic volumes (filled circles) which are equal to or higher than the upper limit traffic volume, as abnormal traffic. Here, a determination condition of abnormal traffic is expressed in formula 1 and a determination condition of normal traffic is expressed in formula 2.

Upper limit traffic volume≤actually-measured traffic volume at prediction graph generation time    Formula 1

Upper limit traffic volume>actually-measured traffic volume at prediction graph generation time    Formula 2

In the example of the graph of FIG. 12, the actually-measured traffic volume at 10:20 which is the prediction graph generation time is 142 Mb and thus exceeds 133 Mb which is the upper limit traffic volume, being determined as abnormal traffic.

Figure 13:
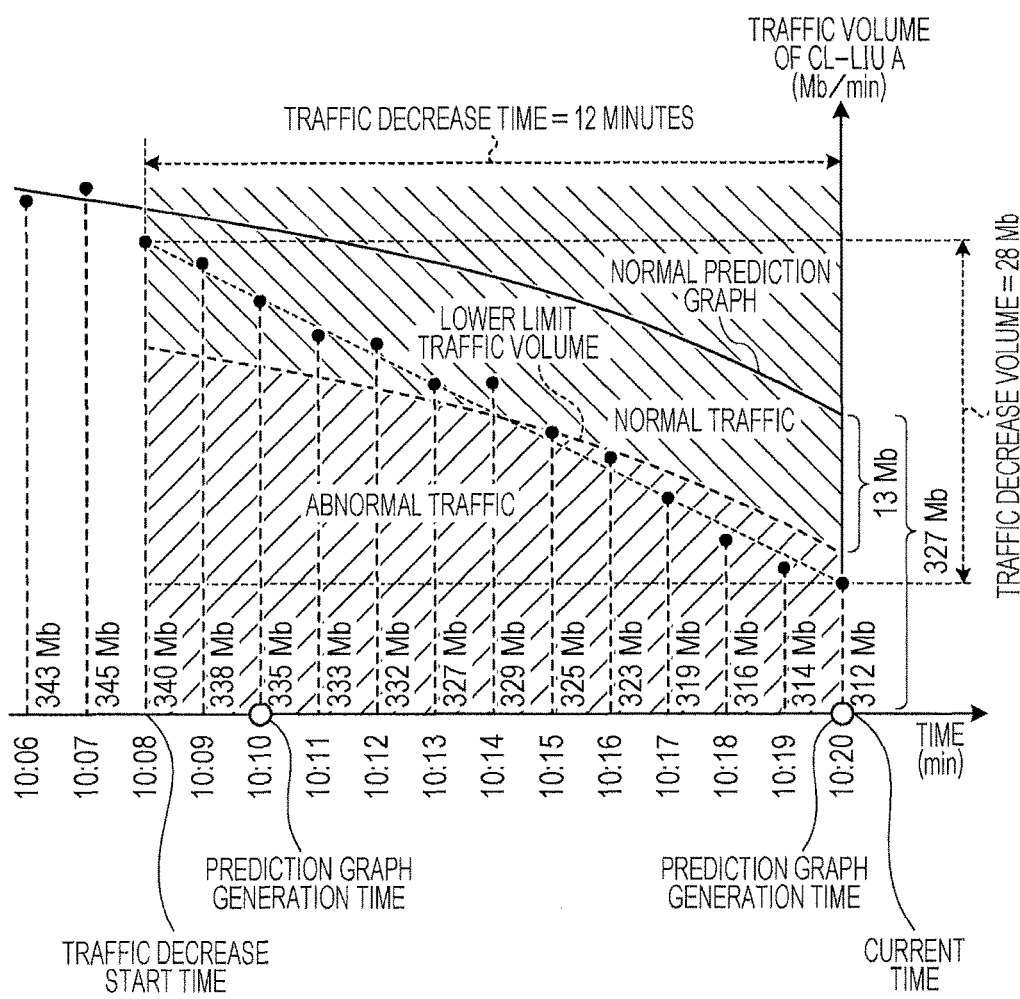
FIG. 13 illustrates an example of an abnormal traffic detection method (decrease)

FIG. 13 illustrates an example of a method for detecting abnormal traffic (decrease). In a graph of FIG. 13, a horizontal axis represents time (min) and a vertical axis represents the traffic volume (Mb/min) of the CL-LIU card 11A. In the graph of FIG. 13, current time is 10:20, for example. Further, in the graph of FIG. 13, filled circles denote actually-measured traffic volumes per minute from 10:06 to 10:20. Further, 10:10 and 10:20 are prediction graph generation time and thus, detection of abnormal traffic is performed every 10 minutes.

A normal prediction graph of the graph of FIG. 13 is a graph of which the traffic volume is decreased along with time. The lower limit traffic volume is smaller than the normal prediction graph by 13 Mb, being a graph of a curve similar to the normal prediction graph. Here, the prediction traffic volume of the normal prediction graph at current time (10:20) is 327 Mb.

The calculation unit 21 determines the actually-measured traffic volumes (filled circles) which are depicted between the normal prediction graph and the lower limit traffic volume in the graph of FIG. 13, as normal traffic which is traffic in normal time. Further, the calculation unit 21 determines the actually-measured traffic volumes (filled circles) which are smaller than the lower limit traffic volume, as abnormal traffic. Here, a determination condition of abnormal traffic is expressed in formula 3 and a determination condition of normal traffic is expressed in formula 4.

Lower limit traffic volume≥actually-measured traffic volume at prediction graph generation time    Formula 3

Lower limit traffic volume<actually-measured traffic volume at prediction graph generation time    Formula 4

In the example of the graph of FIG. 13, the actually-measured traffic volume at 10:20 which is the prediction graph generation time is 312 Mb and thus smaller than 314 Mb which is the lower limit traffic volume, being determined as abnormal traffic. According to the abnormal traffic detection processing, it is possible to detect abnormal traffic on the basis of the upper limit traffic volume or the lower limit traffic volume.

[Processing for Calculating Increase/Decrease Parameter of Abnormal Traffic (Operation S13)]

When it is determined that an actually-measured traffic volume at prediction graph generation time is abnormal traffic, the calculation unit 21 calculates traffic increase/decrease time and a traffic increase/decrease volume which are increase/decrease parameters of abnormal traffic.

Figure 14:
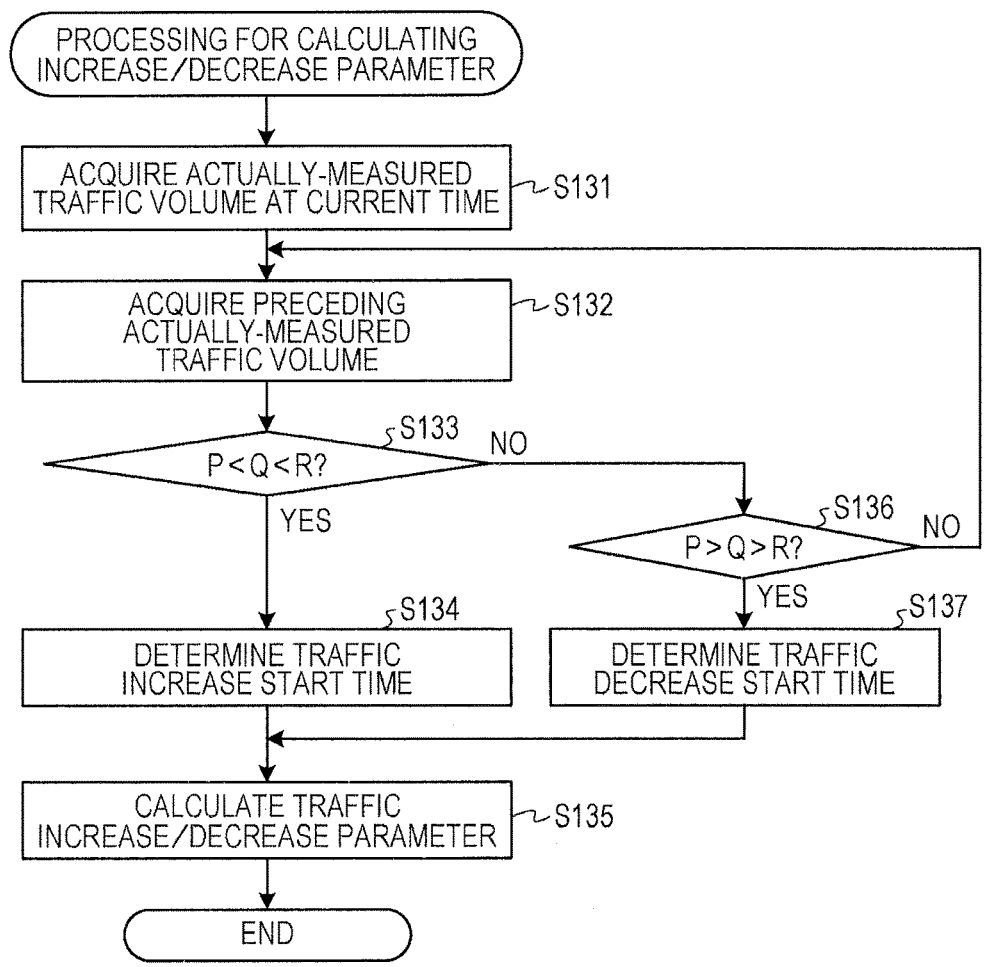
FIG. 14 is a flowchart illustrating an example of processing for calculating an increase/decrease parameter.

FIG. 14 is a flowchart illustrating an example of the processing for calculating an increase/decrease parameter. When abnormal traffic is detected in operation S12, the calculation unit 21 acquires the actually-measured traffic volume at current time at which the abnormal traffic is detected (operation S131). For example, in the case illustrated in FIG. 12, the actually-measured traffic volume at current time is 142 Mb.

Subsequently, the calculation unit 21 acquires the actually-measured traffic volume of the preceding time, that is, the actually-measured traffic volume obtained one period of time before, from the statistics traffic DB 31 (operation S132). For example, in the case illustrated in FIG. 12, actually-measured traffic volumes are collected on a minute-by-minute basis. Accordingly, when current time is 10:20, the calculation unit 21 acquires the actually-measured traffic volume (141 Mb) at 10:19 as the preceding actually-measured traffic volume from the statistics traffic DB 31.

The calculation unit 21 determines traffic increase start time on the basis of whether or not formula 5 is satisfied (operation S133). In formula 5, P denotes the preceding actually-measured traffic volume, Q denotes the preceding normal traffic prediction volume, and R denotes the actually-measured traffic volume at current time.

P<Q<R    Formula 5

That is, in operation S133, the calculation unit 21 determines time at which the actually-measured traffic volume exceeds the normal traffic prediction volume. For example, in the graph of FIG. 12, when current time is 10:20, P is the actually-measured traffic volume at 10:19 (141 Mb), Q is the normal traffic prediction volume at 10:19 (110 Mb), and R is the actually-measured traffic volume at 10:20 (142 Mb). When these amounts are substituted into formula 5, 141 Mb<110 MB<142 Mb is obtained. Thus, formula 5 is not satisfied (negative in operation S133).

When the above-mentioned formula 5 is not satisfied, the calculation unit 21 determines traffic decrease start time on the basis of whether or not formula 6 is satisfied (operation S136). In formula 6, P denotes the preceding actually-measured traffic volume, Q denotes the preceding normal traffic prediction volume, and R denotes the actually-measured traffic volume at current time, as is the case with formula 5.

P>Q>R    Formula 6

That is, in operation S136, the calculation unit 21 determines time at which the actually-measured traffic volume becomes smaller than the normal traffic prediction volume. For example, in the graph of FIG. 12, when current time is 10:20, P is the actually-measured traffic volume at 10:19 (141 Mb), Q is the normal traffic prediction volume at 10:19 (110 Mb), and R is the actually-measured traffic volume at 10:20 (142 Mb). When these amounts are substituted into formula 6, 141 Mb>110 MB>142 Mb is obtained. Thus, formula 6 is not satisfied (negative in operation S136).

When the above-mentioned formula 6 is not satisfied, the calculation unit 21 returns to operation S132. The calculation unit 21 acquires traffic volumes of further one period of time before as traffic volumes which are to be substituted into P, Q, and R, from the statistics traffic DB 31 (operation S132). For example, in the graph of FIG. 12, P is the actually-measured traffic volume at 10:18 (136 Mb), Q is the normal traffic prediction volume at 10:18 (110 Mb), and R is the actually-measured traffic volume at 10:19 (141 Mb).

The calculation unit 21 determines traffic increase start time or traffic decrease start time on the basis of whether or not formula 5 or formula 6 is satisfied again (operations S133 and S136). The calculation unit 21 repeats operation S132, operation S133, and operation S136 until formula 5 or formula 6 is satisfied.

In the example of traffic volume increase illustrated in FIG. 12, when operation S132, operation S133, and operation S136 are repeated until P is set to be the actually-measured traffic volume at 10:07, formula 5 is satisfied (positive in operation S133). That is, P is the actually-measured traffic volume at 10:07 (109 Mb), Q is the normal traffic prediction volume at 10:07 (110 Mb), and R is the actually-measured traffic volume at 10:08 (112 Mb). When these amounts are substituted into formula 5, 109 Mb<110 Mb<112 Mb is obtained. Thus, formula 5 is satisfied.

When a result of operation S133 is positive, the calculation unit 21 determines time of R in formula 5 as traffic increase start time (operation S134). That is, time at which the actually-measured traffic volume first becomes to be equal to or larger than the normal traffic prediction volume is determined as the traffic increase start time. In the above example, R is the actually-measured traffic volume at 10:08 (112 Mb), so that the traffic increase start time is 10:08.

In the example of traffic volume decrease illustrated in FIG. 13, when operation S132, operation S133, and operation S136 are repeated until P is set to be the actually-measured traffic volume at 10:07, formula 6 is satisfied (positive in operation S136). That is, P is the actually-measured traffic volume at 10:07 (345 Mb), Q is the normal traffic prediction volume at 10:07 (344 Mb), and R is the actually-measured traffic volume at 10:08 (340 Mb). When these amounts are substituted into formula 6, 345 Mb>344 Mb>340 Mb is obtained. Thus, formula 6 is satisfied.

When a result of operation S136 is positive, the calculation unit 21 determines time of R in formula 6 as traffic decrease start time (operation S137). That is, time at which the actually-measured traffic volume first becomes to be smaller than the normal traffic prediction volume is determined as the traffic decrease start time. In the above example, R is the actually-measured traffic volume at 10:08 (340 Mb), so that the traffic decrease start time is 10:08.

The calculation unit 21 calculates traffic increase/decrease time and a traffic increase/decrease volume by formula 7 and formula 8 as increase/decrease parameters (operation S135).

Traffic increase/decrease time=current time−traffic increase (decrease)start time    Formula 7

Traffic increase/decrease volume=actually-measured traffic volume at current time−actually-measured traffic volume at traffic increase(decrease) start time    Formula 8

In the example of the traffic volume increase illustrated in FIG. 12, the following formulas 7-1 and 8-1 are obtained.

Traffic increase/decrease time=10:20−10:08=12 minutes    Formula 7-1

Traffic increase/decrease volume=142 Mb−112 Mb=30 Mb    Formula 8-1

In the example of the traffic volume decrease illustrated in FIG. 13, the following formulas 7-2 and 8-2 are obtained.

Traffic increase/decrease time=10:20−10:08=12 minutes    Formula 7-2

Traffic increase/decrease volume=312 Mb−340 Mb=−28 Mb    Formula 8-2

According to the processing for calculating an increase/decrease parameter of abnormal traffic, traffic increase start time or traffic decrease start time is obtained to be compared with the normal traffic prediction volume of the normal prediction graph, being able to calculate increase/decrease parameters of abnormal traffic.

[Processing for Extracting Increase/Decrease Parameter of Similar Pattern (Operation S14)]

Figure 15:
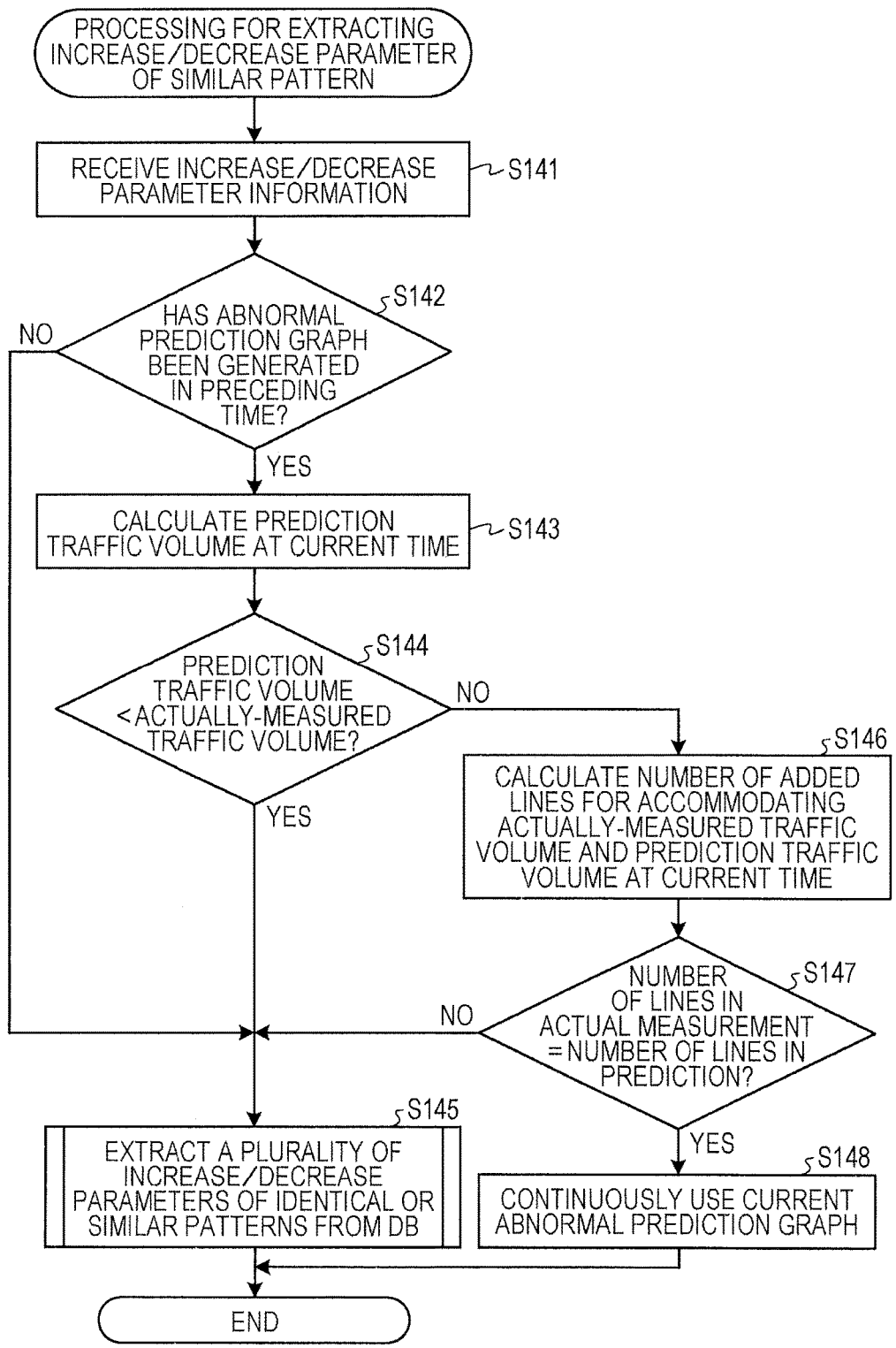
FIG. 15 is a flowchart illustrating an example of processing for extracting an increase/decrease parameter of a similar pattern.

The pattern extraction unit 23 determines whether or not to newly generate an abnormal prediction graph, on the basis of an increase/decrease parameter of abnormal traffic. FIG. 15 is a flowchart illustrating an example of the processing for extracting an increase/decrease parameter of a similar pattern.

The pattern extraction unit 23 receives an increase/decrease parameter of abnormal traffic from the calculation unit 21 (operation S141). The pattern extraction unit 23 refers to the prediction graph DB 33 so as to determine whether or not an abnormal prediction graph has been generated in the preceding prediction graph generation time (operation S142). When an abnormal prediction graph has been generated in the preceding prediction graph generation time (positive in operation S142), the pattern extraction unit 23 acquires the abnormal prediction graph to calculate the prediction traffic volume at current time (operation S143). Further, the pattern extraction unit 23 acquires the actually-measured traffic volume at current time from the statistics traffic DB 31. When an abnormal prediction graph has not been generated in the preceding prediction graph generation time (negative in operation S142), the pattern extraction unit 23 goes to operation S145 to extract increase/decrease parameters of similar patterns.

The pattern extraction unit 23 compares the calculated prediction traffic volume at current time with the actually-measured traffic volume at current time (operation S144). When the prediction traffic volume at current time is equal to or smaller than the actually-measured traffic volume (positive in operation S144), the pattern extraction unit 23 goes to operation S145 to extract increase/decrease parameters of similar patterns.

When the prediction traffic volume at current time is larger than the actually-measured traffic volume (negative in operation S144), the pattern extraction unit 23 calculates the number of lines for accommodating the actually-measured traffic volume and the prediction traffic volume at current time (operation S146). The pattern extraction unit 23 sets the number of lines for accommodating the actually-measured traffic volume at current time as the number of lines in actual measurement and sets the number of lines for accommodating the prediction traffic volume at current time as the number of lines in prediction.

The pattern extraction unit 23 compares the number of lines in actual measurement with the number of lines in prediction (operation S147). When the number of lines in actual measurement is accorded with the number of lines in prediction (positive in operation S147), the pattern extraction unit 23 transmits information representing that the current abnormal prediction graph is continuously used to the prediction graph generation unit 24 and ends the processing for extracting an increase/decrease parameter of a similar pattern (operation S148). When the number of lines in actual measurement is not accorded with the number of lines in prediction (negative in operation S147), the pattern extraction unit 23 goes to operation S145 to extract increase/decrease parameters of similar patterns.

When an abnormal prediction graph is newly generated, the pattern extraction unit 23 extracts one or more increase/decrease parameters of patterns which are identical or similar to the increase/decrease parameter of the abnormal traffic, from the statistics traffic DB 31 (operation S145).

Figure 16:
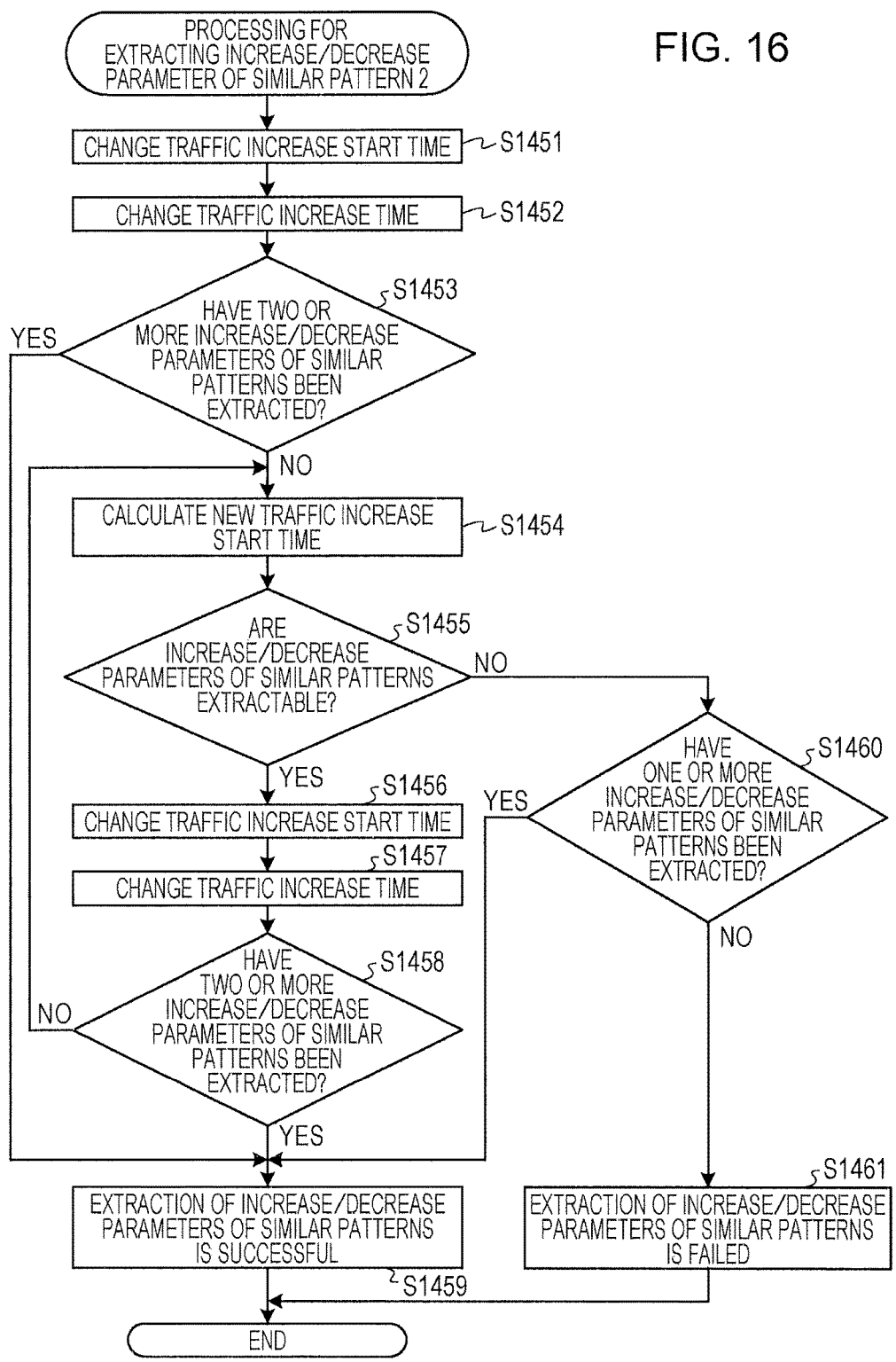
FIG. 16 is a flowchart illustrating an example of details of the processing for extracting an increase/decrease parameter of a similar pattern.

FIG. 16 is a flowchart illustrating an example of details of processing for extracting increase/decrease parameters of similar patterns. Here, it is important to extract a plurality of similar patterns so as to enhance accuracy of an abnormal prediction graph.

Figure 17:
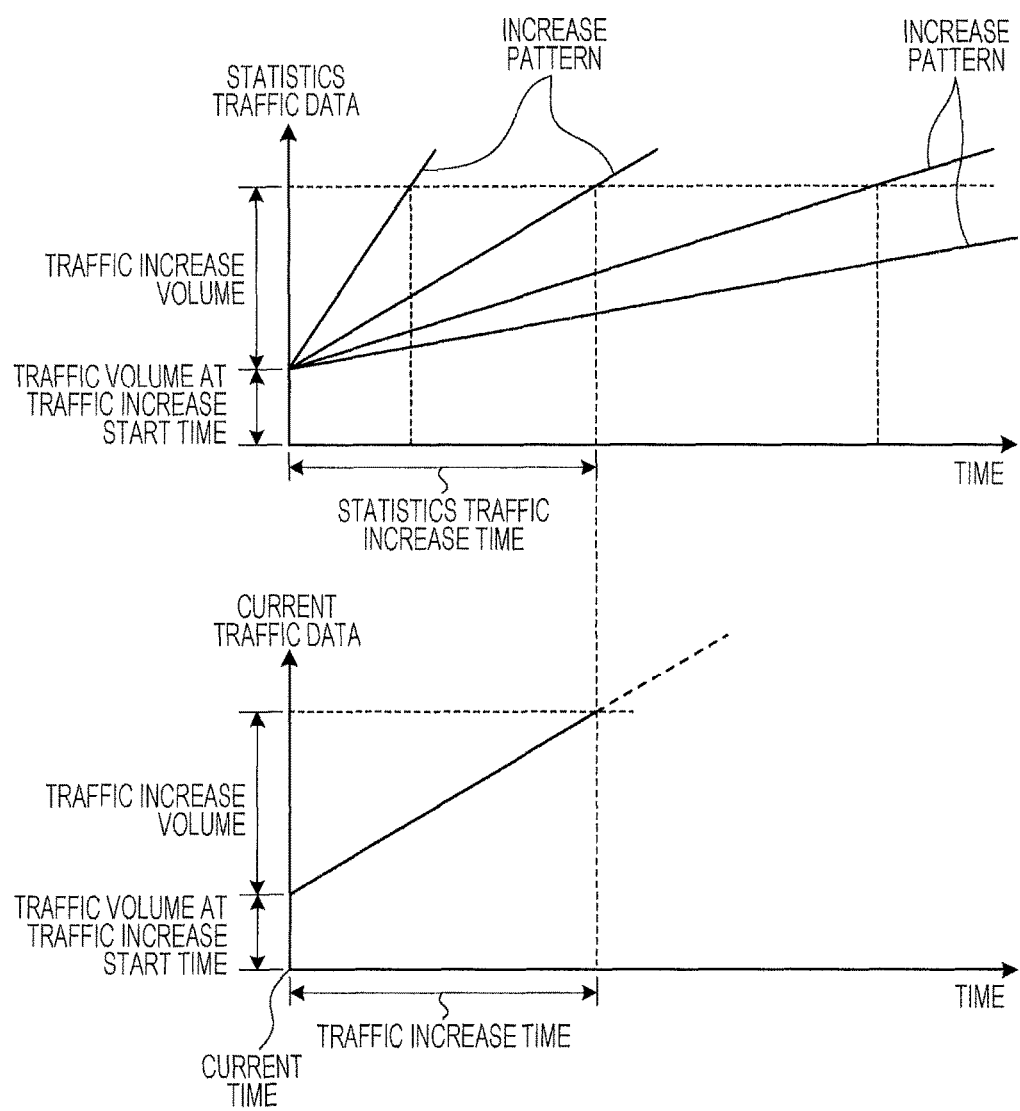
FIG. 17 illustrates an example of a method for extracting an increase/decrease parameter of a similar pattern.

FIG. 17 illustrates an example of a method for extracting increase/decrease parameters of similar patterns. In FIG. 17, an upper graph illustrates increase/decrease parameters of a plurality of similar patterns which are stored in the statistics traffic DB 31 and a lower graph illustrates a parameter of abnormal traffic. Even if the pattern extraction unit 23 tries to extract increase/decrease parameters of patterns which are accorded with the increase/decrease parameter of the abnormal traffic, it is difficult for the pattern extraction unit 23 to extract a plurality of identical increase/decrease parameters only by simply applying increase/decrease parameters of a plurality of similar patterns which are stored in the statistics traffic DB 31.

Therefore, the pattern extraction unit 23 attempts (A) a method in which latitude is provided to the traffic volume at traffic increase (decrease) start time and (B) a method in which latitude is provided to traffic increase (decrease) time of the statistics traffic DB 31, so as to extract a plurality of increase/decrease parameters. In a case in which it is difficult to extract a plurality of increase/decrease parameters of similar patterns even by the methods of (A) and (B), the pattern extraction unit 23 attempts (C) a method in which latitude is provided to traffic increase (decrease) start time.

(A) In the method in which latitude is provided to the traffic volume at traffic increase start time, the traffic volume at traffic increase start time is changed between the upper limit traffic volume and the normal traffic volume of the normal prediction graph. Further, the traffic volume at traffic decrease start time is changed between the lower limit traffic volume and the normal traffic volume of the normal prediction graph. That is, increase/decrease parameters of similar patterns having the traffic volume in these ranges are extracted from the statistics traffic DB 31. In other words, a start point of a graph which is generated on the basis of increase/decrease parameters is changed so as to search and extract increase/decrease parameters of similar patterns which are accorded with or similar to the increase/decrease parameter of the abnormal traffic without changing the inclination of the graph (operation S1451).

Figure 18:
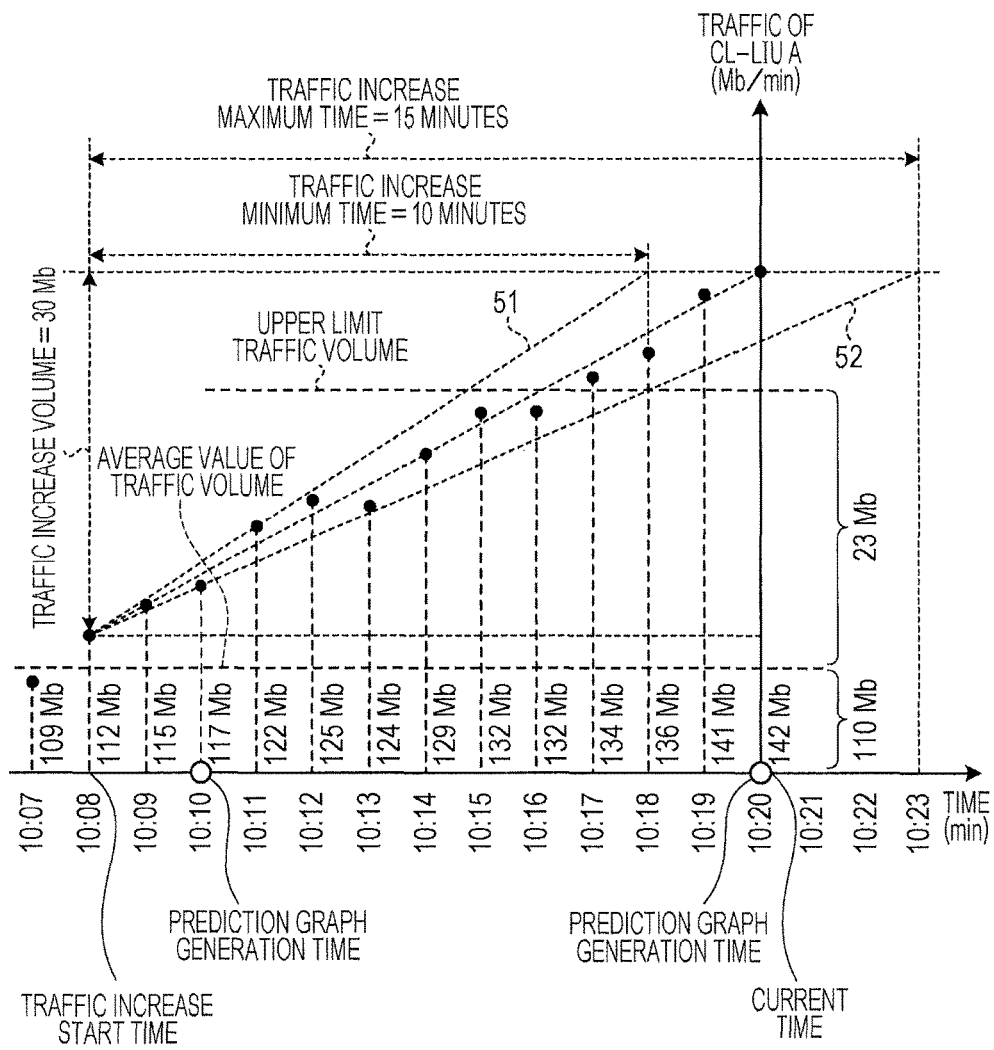
FIG. 18 illustrates an example of a method for setting an extraction range of a similar pattern.

(B) In the method in which latitude is provided to traffic increase (decrease) time of the statistics traffic DB 31, traffic increase (decrease) time is changed so as to search increase/decrease parameters of patterns which are accorded with the increase/decrease parameter of the abnormal traffic. FIG. 18 illustrates an example of a method for setting an extraction range of a similar pattern. FIG. 18 illustrates an example of a method for setting an extraction range of increase/decrease parameters of similar patterns according to the method of (B) and an example of a case in which traffic is increased.

First, the actually-measured traffic volume at traffic increase start time (10:08) and the actually-measured traffic volumes in each traffic monitoring time (per minute) from the traffic increase start time to current time (10:20) are connected with straight lines. Among these straight lines, a straight line 51 having the largest inclination and a straight line 52 having the smallest inclination are selected. In order to obtain traffic increase minimum time, the straight line 51 is extended until the straight line 51 intersects with a straight line which passes through the traffic volume at current time and has the inclination of 0 (a straight line parallel with X axis). A perpendicular line is drawn from the intersection point to X axis so as to obtain time. In the example of FIG. 18, 10:18 is obtained. The traffic increase minimum time is obtained as 10 minutes by deducting 10:08 which is the traffic increase start time from 10:18.

In order to obtain traffic increase maximum time, the straight line 52 is extended until the straight line 52 intersects with the straight line which passes through the traffic volume at current time and has the inclination of 0 (the straight line parallel with X axis). A perpendicular line is drawn from the intersection point to X axis so as to obtain time. In the example of FIG. 18, 10:23 is obtained. The traffic increase maximum time is obtained as 15 minutes by deducting 10:08 which is the traffic increase start time from 10:23.

The pattern extraction unit 23 extracts increase/decrease parameters of similar patterns having the traffic volume corresponding to the traffic increase minimum time and the traffic increase maximum time from the statistics traffic DB 31. That is, the traffic increase time is changed so as to search and extract increase/decrease parameters of patterns which are accorded with the increase/decrease parameter of the abnormal traffic (operation S1452).

The pattern extraction unit 23 determines whether or not to have succeeded in extraction of two or more increase/decrease parameters of similar patterns in operation S1451 and operation S1452 (operation S1453). When the pattern extraction unit 23 has succeeded in extraction of two or more increase/decrease parameters of similar patterns (positive in operation S1453), the pattern extraction unit 23 goes to operation S1459 which will be described later. When the pattern extraction unit 23 has failed to extract two or more increase/decrease parameters of similar patterns (negative in operation S1453), the pattern extraction unit 23 attempts (C) the method in which latitude is provided to the traffic increase (decrease) start time. The pattern extraction unit 23 calculates new traffic increase (decrease) start time by formula 9 (operation S1454). Here, the number, which is to be determined, of pieces of increase/decrease parameters of similar patterns is not limited to two and may be arbitrary.

New traffic increase (decrease) start time=traffic increase (decrease) start time±time width     Formula 9

Here, it is preferable to set a time width in a unit of traffic monitoring time. In the first embodiment, the traffic monitoring time is one minute, so that it is preferable to set the initial time width to ±1 minute. For example, the time width is set as ±1 minute in FIG. 18. The traffic increase start time is 10:08, so that new traffic increase start time is 10:07 and 10:09. Further, when the processing is repeatedly performed, the time width is expanded to ±2 minutes and ±3 minutes, for example. In the first embodiment, it is assumed that the time width is expandable up to 20 minutes. However, the maximum time width is not limited to 20 minutes, but the maximum time width may be arbitrarily set.

The pattern extraction unit 23 determines whether or not increase/decrease parameters of similar patterns are extractable at new traffic increase (decrease) start time (operation S1455). When increase/decrease parameters of similar patterns are extractable (positive in operation S1455), the pattern extraction unit 23 executes a method in which latitude is provided to the traffic volume of traffic increase (decrease) start time, in a similar manner to operation S1451 (operation S1456). Further, the pattern extraction unit 23 executes a method in which latitude is provided to traffic increase (decrease) time of the statistics traffic DB 31, in a similar manner to operation S1452 (operation S1457).

The pattern extraction unit 23 determines whether or not to have been able to extract two or more increase/decrease parameters of similar patterns through operation S1451, operation S1452, operation S1456, and operation S1457 (operation S1458). When the pattern extraction unit 23 has been able to extract two or more increase/decrease parameters of similar patterns (positive in operation S1458), the pattern extraction unit 23 goes to operation S1459. When the pattern extraction unit 23 has failed to extract two or more increase/decrease parameters of similar patterns (negative in operation S1458), the pattern extraction unit 23 returns to operation S1454 and increases the time width of new traffic increase (decrease) start time. The pattern extraction unit 23 repeats processing from operation S1454 to operation S1458 until a result of operation S1455 becomes negative or a result of operation S1458 becomes positive.

When increase/decrease parameters of similar patterns are not extractable (negative in operation S1455), the pattern extraction unit 23 determines whether or not to have extracted one or more increase/decrease parameters of similar patterns (operation S1460). That is, in a case in which similar patterns are not found even though the time width is expanded to the maximum of 20 minutes, the pattern extraction unit 23 determines whether or not to have extracted one or more increase/decrease parameters of similar patterns. When the pattern extraction unit 23 has extracted one or more increase/decrease parameters of similar patterns (positive in operation S1460), the pattern extraction unit 23 goes to operation S1459. When the pattern extraction unit 23 has failed to extract one or more increase/decrease parameters of similar patterns (negative in operation S1460), the pattern extraction unit 23 transmits information representing the failure of extraction of increase/decrease parameters of similar patterns to the prediction graph generation unit 24 (operation S1461).

When the pattern extraction unit 23 has extracted one or more increase/decrease parameters of similar patterns, the pattern extraction unit 23 transmits the extracted increase/decrease parameters of similar patterns to the prediction graph generation unit 24. Further, the pattern extraction unit 23 transmits information representing success of the processing for extracting increase/decrease parameters of similar patterns to the prediction graph generation unit 24 (operation S1459). According to the processing for extracting an increase/decrease parameter of a similar pattern, increase/decrease parameters of identical or similar patterns are extractable depending on an increase/decrease parameter of the abnormal traffic.

[Prediction Graph Generation Processing (Operation S15)]

Figure 19:
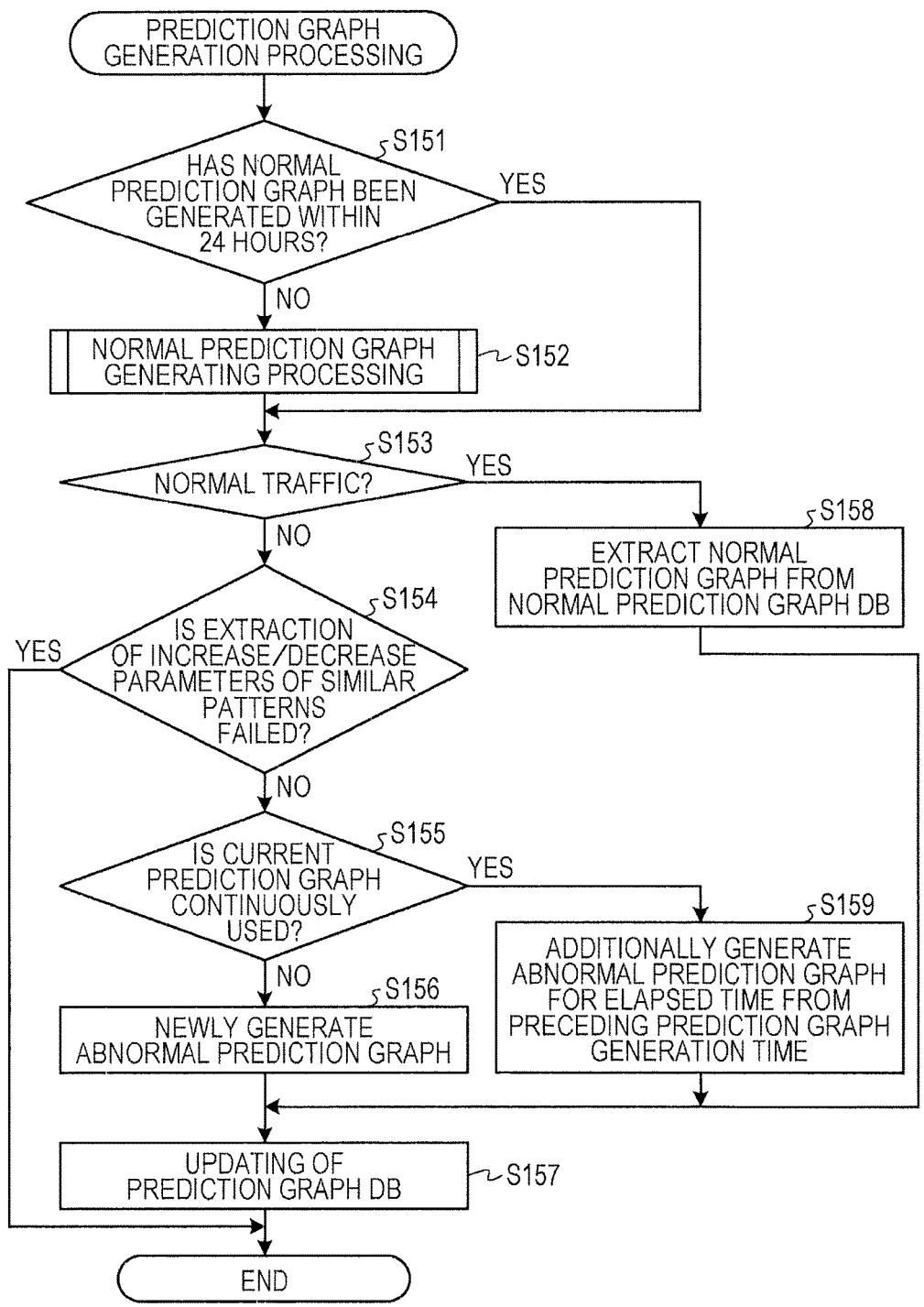
FIG. 19 is a flowchart illustrating an example of processing for generating a prediction graph for each CL-LIU card.

FIG. 19 is a flowchart illustrating an example of a processing for generating a prediction graph for each CL-LIU card. The prediction graph generation unit 24 determines whether or not a normal prediction graph has been generated within 24 hours (operation S151). When a normal prediction graph has been generated within 24 hours (positive in operation S151), the prediction graph generation unit 24 goes to operation S153. When a normal prediction graph has not been generated within 24 hours (negative in operation S151), the prediction graph generation unit 24 instructs the normal prediction graph generation unit 22 to generate a normal prediction graph (operation S152).

Figure 20:
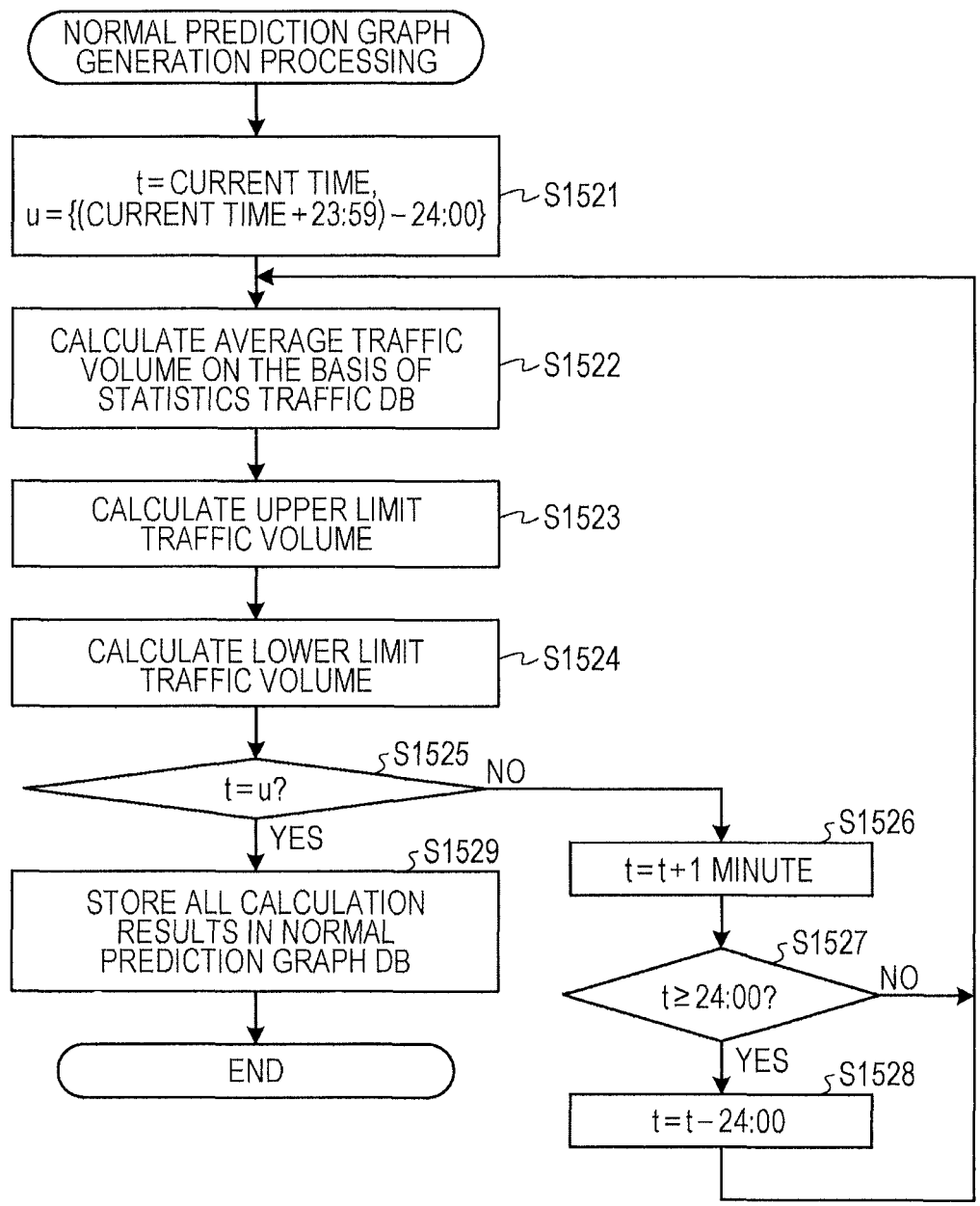
FIG. 20 is a flowchart illustrating an example of normal prediction graph generation processing.

FIG. 20 is a flowchart illustrating an example of a normal prediction graph generation processing. In other words, FIG. 20 is a flowchart illustrating an example of a normal prediction graph generation processing of operation S152 in the normal prediction graph generation unit 22.

The normal prediction graph generation unit 22 acquires current time and set the current time to t as initial setting. Further, the normal prediction graph generation unit 22 sets u for determining whether or not calculation for 24 hours has been completed, on the basis of formula 10 (operation S1521). For example, when current time is 08:00 on a weekday, t is 08:00 and u is 07:59.

$$u = \{(\text{current time} + 23{:}59) - 24{:}00\} \quad \text{Formula 10}$$

FIG. 21 illustrates an example of statistics traffic data. The normal prediction graph generation unit 22 acquires the statistics traffic volume (statistics traffic data) depicted in FIG. 21 from the statistics traffic DB 31. The statistics traffic volume depicted in FIG. 21 is obtained by extracting traffic volumes at 08:00 on weekdays for one year to several years, from the statistics traffic DB 31, for example.

The normal prediction graph generation unit 22 calculates an average traffic volume with formula 11 on the basis of the extracted statistics traffic volumes (operation S1522).

$$\text{AVERAGE TRAFFIC VOLUME} = \frac{\text{INTEGRATED TRAFFIC VOLUME AT 08:00 ON WEEKDAYS}}{\text{NUMBER OF WEEKDAYS}} \quad \text{Formula 11}$$

The normal prediction graph generation unit 22 extracts traffic volumes at 08:00 on weekdays for one year from the statistics traffic DB 31, for example. All of the extracted traffic volumes at 08:00 of weekdays in one year are summed so as to set the obtained traffic volume as the integrated traffic volume at 08:00 on weekdays. The integrated traffic volume at 08:00 on weekdays is divided by the number of weekdays in one year so as to calculate the average traffic volume at 08:00 on weekdays.

The normal prediction graph generation unit 22 calculates distribution of the traffic volume at 08:00 on weekdays, as well. For the calculation of distribution, normal distribution may be used, for example. When a random variable is denoted as X and an average of random variables X is denoted as μ, it is possible to obtain distribution of the random variables X on the basis of an average of $(X-\mu)^2$. Here, the calculation of distribution is not limitedly based on the normal distribution, but t distribution, chi-squared distribution, or the like may be used. For example, distribution of the average traffic volume at 08:00 on weekdays may be calculated by formula 12.

$$\text{DISTRIBUTION} = \frac{\text{SUM OF}\left(\begin{array}{c}\text{TRAFFIC VOLUME AT}\\ \text{08:00 ON WEEKDAYS} -\\ \text{AVERAGE TRAFFIC VOLUME}\end{array}\right)^2}{\text{NUMBER OF WEEKDAYS}} \quad \text{Formula 12}$$

That is, when the statistics traffic volume depicted in FIG. 21 is substituted into formula 12, distribution of the traffic volume at 08:00 on weekdays which is depicted in FIG. 21 may be expressed as formula 13. Here, it is assumed that the average traffic volume at 08:00 on weekdays is 368 Mb.

$$\text{DISTRIBUTION} = \frac{(370-368)^2 + (372-368)^2 + (365-368)^2 + \ldots}{(\text{NUMBER OF WEEKDAYS})} \quad \text{Formula 13}$$

When the normal prediction graph generation unit 22 calculates the average traffic volume and distribution of the traffic volume, the normal prediction graph generation unit 22 calculates the upper limit traffic volume and the lower limit traffic volume (operations S1523 and S1524). The upper limit traffic volume and the lower limit traffic volume in a case in which credibility of normal distribution is 95% are calculated by formula 14 and formula 15 respectively.

$$\text{UPPER LIMIT TRAFFIC VOLUME} = \text{AVERAGE TRAFFIC VOLUME} + 1.96 \times \sqrt{\frac{\text{DISTRIBUTION}}{\text{NUMBER OF WEEKDAYS}}} \quad \text{Formula 14}$$

$$\text{LOWER LIMIT TRAFFIC VOLUME} = \text{AVERAGE TRAFFIC VOLUME} - 1.96 \times \sqrt{\frac{\text{DISTRIBUTION}}{\text{NUMBER OF WEEKDAYS}}} \quad \text{Formula 15}$$

When the normal prediction graph generation unit 22 completes the calculation of the average traffic volume, the upper limit traffic volume, and the lower limit traffic volume for 08:00, the normal prediction graph generation unit 22 determines whether or not t is equal to u (operation S1525). Here, t is 08:00 and u is 07:59, so that t is not equal to u (negative in operation S1525).

In a case in which a result of operation S1525 is negative, the normal prediction graph generation unit 22 increases t by one minute (operation S1526). Subsequently, the normal prediction graph generation unit 22 determines whether or not t is 24:00 or larger (operation S1527). When t is 24:00 or larger (positive in operation S1527), the normal prediction graph generation unit 22 deducts 24:00 from t (operation S1528) and returns to operation S1522. Further, when t is smaller than 24:00 (negative in operation S1527), the normal prediction graph generation unit 22 maintains t as it is and returns to operation S1522. The normal prediction graph generation unit 22 repeats processing from operation S1522 to operation S1528 so as to calculate the average traffic volume for 24 hours, the upper limit traffic volume, and the lower limit traffic volume by one-minute unit.

The normal prediction graph generation unit 22 stores all calculation results, namely, the average traffic volume for 24 hours, the upper limit traffic volume, and the lower limit traffic volume in the normal prediction graph DB 32 (operation S1529).

Subsequently, when the prediction graph generation unit 24 receives information representing normal traffic from the calculation unit 21 (positive in operation S153), the prediction graph generation unit 24 extracts and acquires a normal prediction graph in which date information (including a day of the week) and time information are accorded from the normal prediction graph DB 32 (operation S158). The prediction graph generation unit 24 stores the acquired normal prediction graph in the prediction graph DB 33 to update the prediction graph DB 33 (operation S157).

When the prediction graph generation unit 24 receives information representing success of the processing for extracting increase/decrease parameters of similar patterns or information representing a failure of extraction of increase/decrease parameters of similar patterns from the pattern extraction unit 23 (negative in operation S153), the prediction graph generation unit 24 determines as abnormal traffic.

When the prediction graph generation unit 24 receives information representing a failure of extraction of increase/decrease parameters of similar patterns (positive in operation S154), the prediction graph generation unit 24 discards a current prediction graph without generating an abnormal prediction graph and transmits information representing that line allocation processing is performed in equal probability, to the optimization unit 27. When the prediction graph generation unit 24 receives information representing success of the processing for extracting increase/decrease parameters of similar patterns (negative in operation S154), the prediction graph generation unit 24 determines whether or not a current prediction graph is continuously used (operation S155).

When the prediction graph generation unit 24 receives information representing that a current prediction graph is continuously used from the pattern extraction unit 23 (positive in operation S155), the prediction graph generation unit 24 generates an abnormal prediction graph for elapsed time from the preceding prediction graph generation time. The prediction graph generation unit 24 generates an abnormal prediction graph for elapsed time on the basis of the preceding prediction graph and adds the abnormal prediction graph for elapsed time to the preceding prediction graph so as to generate a new abnormal prediction graph (operation S159). The prediction graph generation unit 24 stores the newly-generated abnormal prediction graph in the prediction graph DB 33 so as to update the prediction graph DB 33 (operation S157).

When a current prediction graph is not continuously used (negative in operation S155), the prediction graph generation unit 24 generates an abnormal prediction graph on the basis of the increase/decrease parameter (operation S156). That is, when the prediction graph generation unit 24 receives extracted increase/decrease parameters of similar patterns from the pattern extraction unit 23, the prediction graph generation unit 24 generates an abnormal prediction graph on the basis of the increase/decrease parameters.

Figure 22:
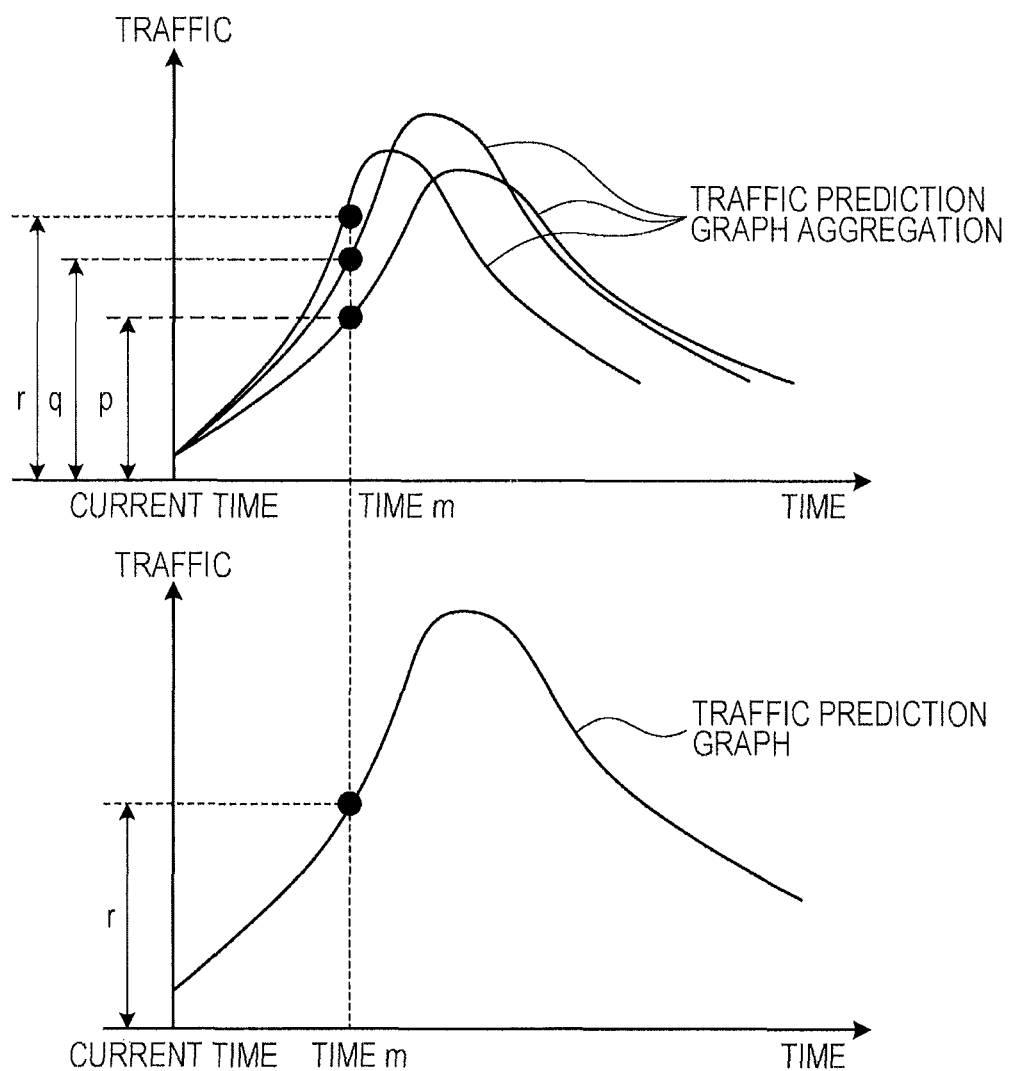
FIG. 22 illustrates an example of a prediction graph generation method.

FIG. 22 illustrates an example of a prediction graph generation method. FIG. 22 illustrates an example of a generation method of an abnormal prediction graph in a case in which three increase/decrease parameters of similar patterns are extracted. The prediction graph generation unit 24 generates graphs of respective similar patterns, which are depicted on the upper side of FIG. 22, on the basis of increase/decrease parameters of similar patterns. For example, when a graph at time m of FIG. 22 is newly generated, traffic volumes (denoted by p, q, and r in FIG. 22) at time m of the graphs of the three similar patterns are focused. Then, r is the maximum traffic volume among the three traffic volumes, so that the prediction traffic volume at time m of the new graph is set to r. The prediction graph generation unit 24 performs similar processing for all points of time in the graphs of the similar patterns so as to generate an abnormal prediction graph on the basis of all of the prediction traffic volumes. The prediction graph generation unit 24 stores the abnormal prediction graph in the prediction graph DB 33 to update the prediction graph DB 33 (operation S157).

FIGS. 23 to 27 illustrate an example of a prediction graph of each of the CL-LIU cards 11A to 11E. A prediction graph is described by taking FIG. 23 as an example. Here, FIGS. 24 to 27 are similar to FIG. 23 except for shapes of graphs, so that detailed description of FIGS. 24 to 27 is omitted. Further, the lines L1 to L8 are allocated to the CL-LIU cards 11A to 11E at current time as following. The lines L1 to L3 are allocated to the CL-LIU card 11A, the line L4 is allocated to the CL-LIU card 11B, no line is allocated to the CL-LIU card 11C, the lines L5 and L6 are allocated to the CL-LIU card 11D, and the lines L7 and L8 are allocated to the CL-LIU card 11E.

Figure 23:
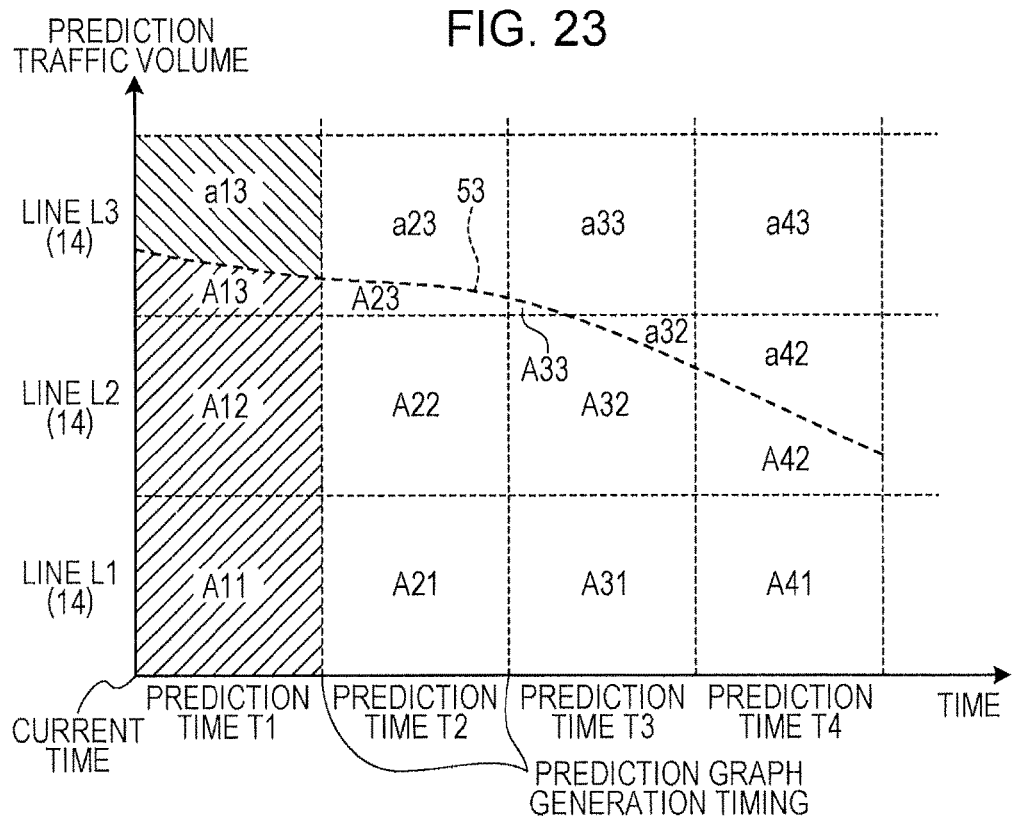
FIG. 23 illustrates an example of a prediction graph of a CL-LIU card A.
Figure 24:
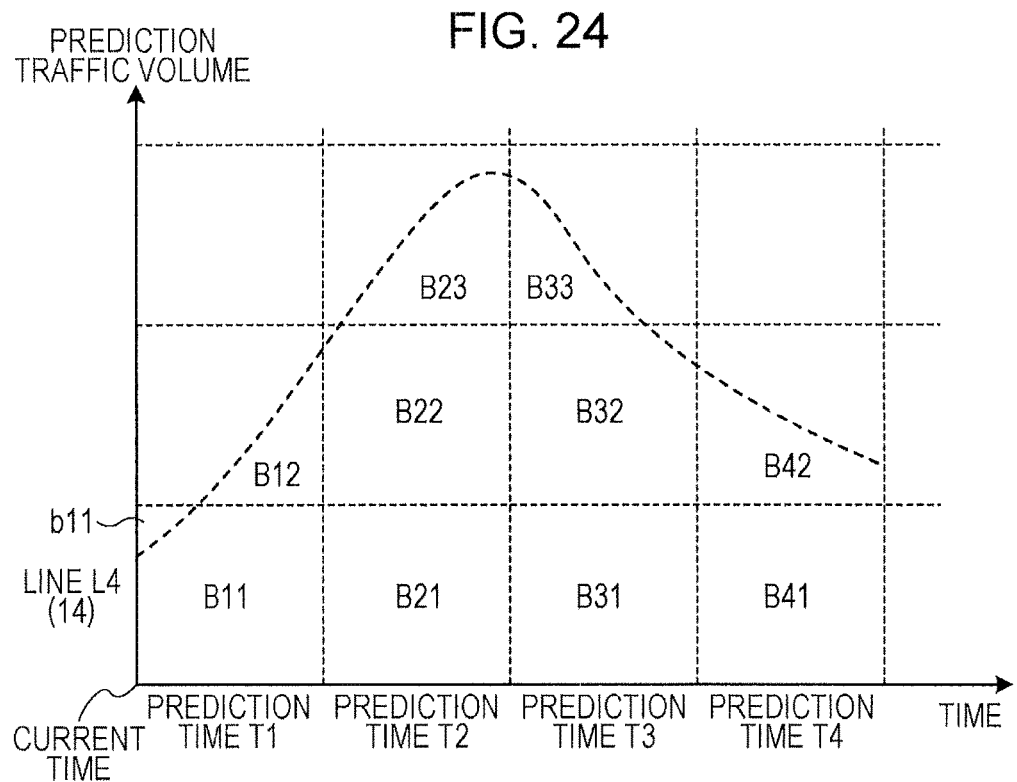
FIG. 24 illustrates an example of a prediction graph of a CL-LIU card B.
Figure 25:
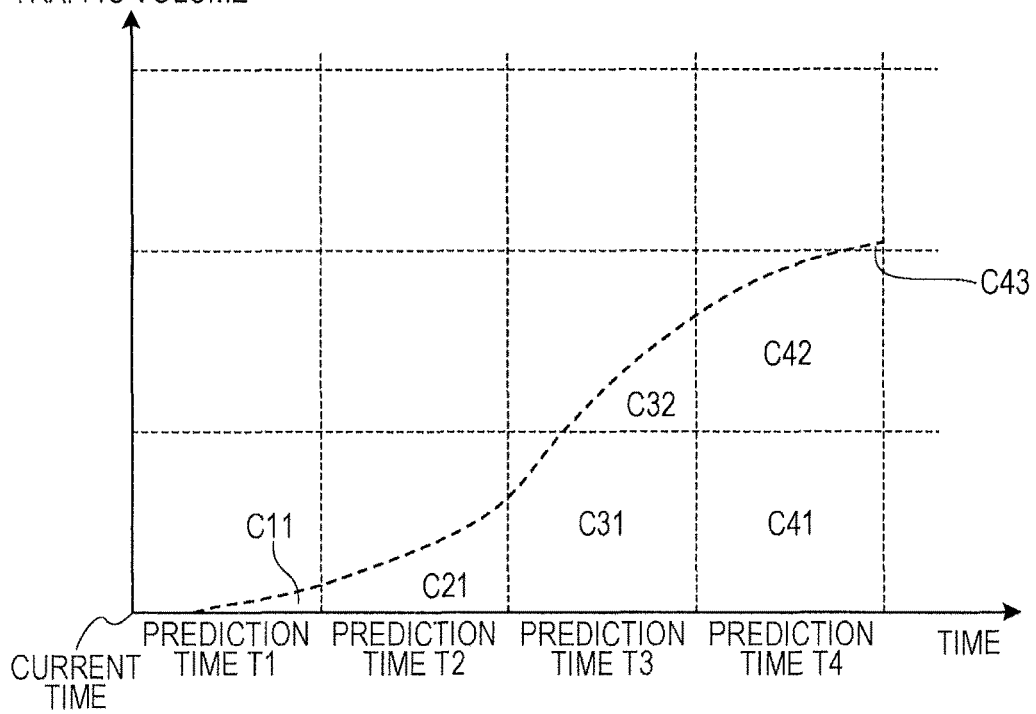
FIG. 25 illustrates an example of a prediction graph of a CL-LIU card C.

FIG. 23 illustrates an example of a prediction graph of the CL-LIU card 11A. X axis of the graph represents time and Y axis represents the prediction traffic volume. The origin represents current time in X axis of the graph of FIG. 23. X axis is separated by prediction time T1 to prediction time T4 which are prescribed periods of prediction time and time of the separation is prediction graph generation timing (prediction graph generation time). Y axis of the graph of FIG. 23 is separated by line capacities (for example, 150 Mb in a case of STS3C) and a capacity for the line L1, a capacity for the line L2, and a capacity for the line L3 are represented from the origin of the graph. Further, a prediction graph 53 of the CL-LIU card 11A represents the prediction traffic volume at each time.

Regions partitioned by the prediction time T1 to T4 and the lines L1 to L3 in FIG. 23 are identified by a combination of an alphabet and a number. An alphabet on the first letter represents a CL-LIU card 11 and is described by A to E or a to e. Here, A to E in capital letters represent the prediction total traffic volume and a to e in small letters represent the prediction unused total traffic volume. A number of the second letter represents the prediction time T1 to T4. For example, a number of the second letter is 1 in a case of the prediction time T1. A number on the third letter represents a line number of the lines L1 to L8. For example, a number of the third letter is 1 in a case of the line L1. For example, A11 represents the prediction total traffic volume of the line L1 in prediction time T1. Further, a13 represents the prediction unused total traffic volume of the line L3 in prediction time T1. According to the prediction graph generation processing, it is possible to generate a prediction graph in accordance with current traffic.

[Processing for Calculating Prediction Traffic Volume (Operation S17)]

Figure 28:
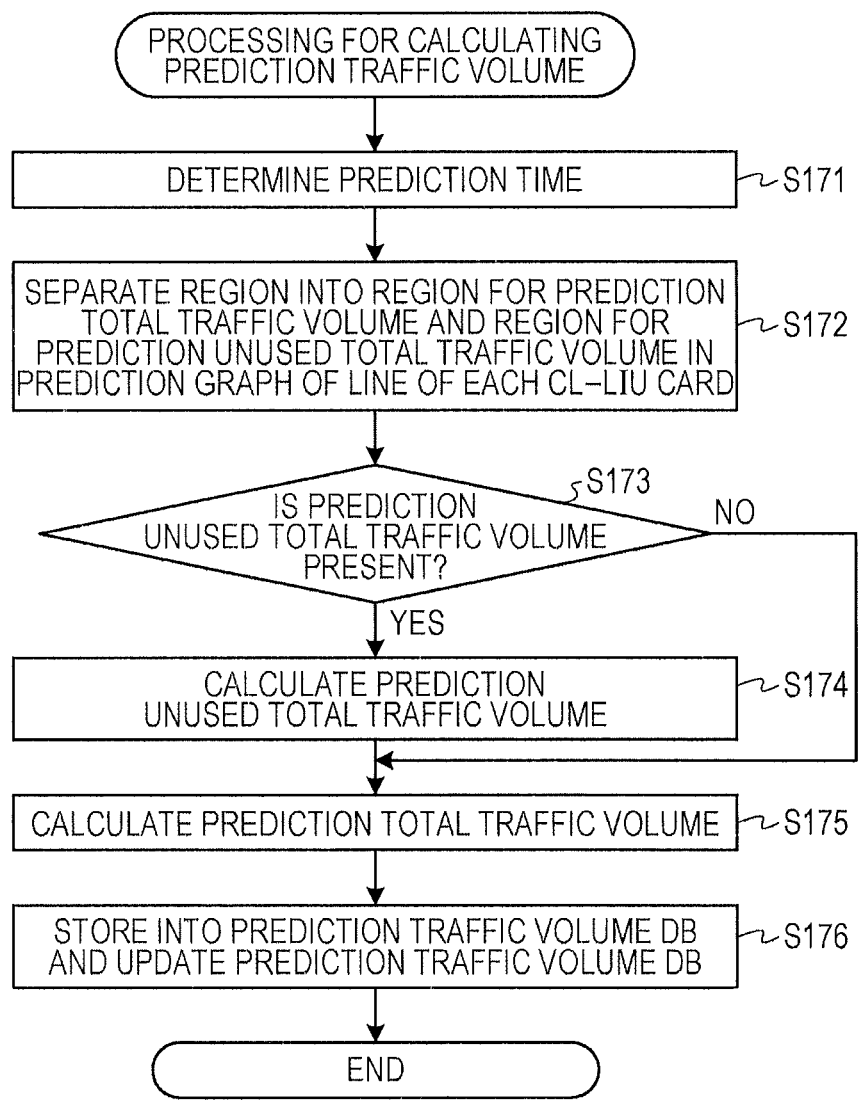
FIG. 28 is a flowchart illustrating an example of processing for calculating a prediction traffic volume.

FIG. 28 is a flowchart illustrating an example of processing for calculating a prediction traffic volume. The prediction graph generation unit 24 determines prediction time which is a unit for changing line allocation (operation S171).

The prediction graph generation unit 24 applies allocation of the lines L1 to L8 at current time for each of the CL-LIU cards 11 in the prediction graphs of FIGS. 23 to 27. The prediction graph generation unit 24 separates a region into regions for the prediction total traffic volume and regions for the prediction unused total traffic volume for each line in each period of prediction time by applying the lines L1 to L8 to the prediction graphs (operation S172).

When the CL-LIU card 11A illustrated in FIG. 23 is taken for instance, the lines L1 to L3 are allocated to the CL-LIU card 11A, so that the line L1, the line L2, and the line L3 are applied in this order from the origin side of Y axis of the graph. Then, the prediction graph 53 passes through a region of the line L3 in prediction time T1. That is, traffic of the whole capacity flows in regions of the line L1 and the line L2 and traffic up to the prediction graph 53 in the whole capacity flows in the region of the line L3 in prediction time T1. When the traffic is represented by the prediction total traffic volume and the prediction unused total traffic volume for each region in FIG. 23, respective regions A11, A12, and A13 are prediction total traffic volumes and a13 is a prediction unused total traffic volume. That is, region separation of a region for the prediction total traffic volume and the prediction unused total traffic volume for prediction time T1 is completed.

The prediction graph generation unit 24 separates a region into regions for the prediction total traffic volume and regions for the prediction unused total traffic volume for prediction time T2 to T4 in the graph of FIG. 23 as well in a similar manner. As a result, prediction total traffic volumes in prediction time T2 are regions A21, A22, and A23 and a prediction unused total traffic volume is a region a23. Prediction total traffic volumes in prediction time T3 are regions A31, A32, and A33 and prediction unused total traffic volumes are regions a32 and a33. Prediction total traffic volumes in prediction time T4 are regions A41 and A42 and prediction unused total traffic volumes are regions a42 and a43.

The prediction graph generation unit 24 determines whether or not a prediction unused total traffic volume is present in the prediction graph (operation S173). When a prediction unused total traffic volume is not present in the prediction graph (negative in operation S173), the prediction graph generation unit 24 goes to operation S175 so as to calculate a prediction total traffic volume. When a prediction unused total traffic volume is present in the prediction graph (positive in operation S173), the prediction graph generation unit 24 calculates the prediction unused total traffic volume (operation S174).

Figure 29:
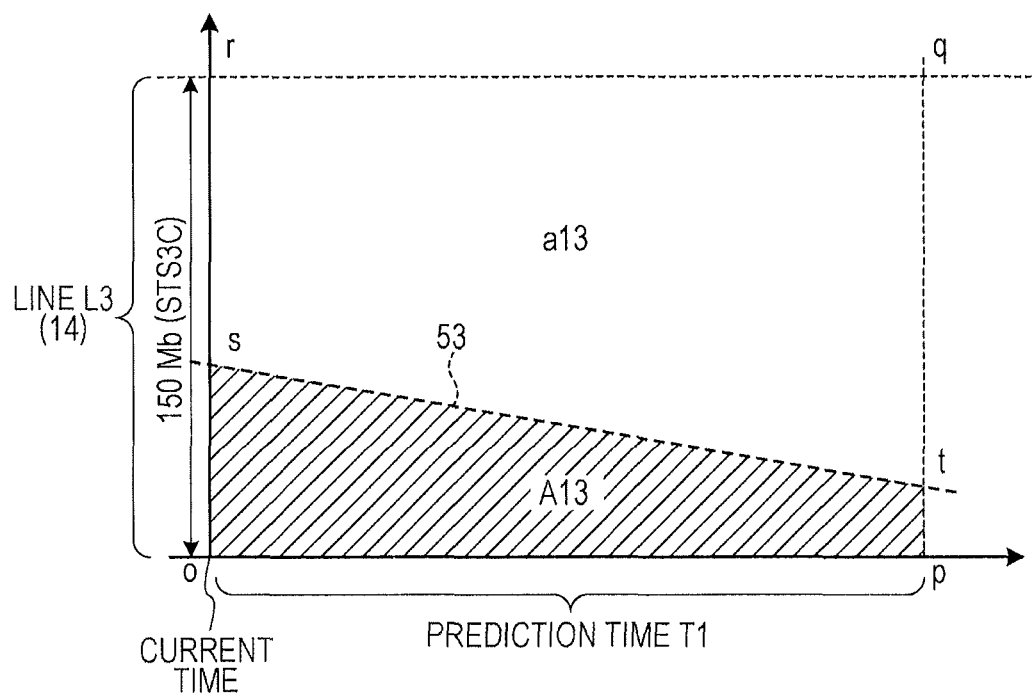
FIG. 29 illustrates an example of a method for calculating a prediction unused total traffic volume.

FIG. 29 illustrates an example of a method for calculating a prediction unused total traffic volume. FIG. 29 illustrates an enlarged region of the line L3 in prediction time T1 of the prediction graph of FIG. 23. The method for calculating a prediction unused total traffic volume in the prediction graph generation unit 24 is described with reference to FIG. 29. In FIG. 29, the prediction unused total traffic volume a13 may be represented by an area surrounded by t, q, r, and s and the prediction unused total traffic volume a13 is calculated on the basis of this area.

When a prediction unused total traffic volume is not present in the prediction graph, the prediction graph generation unit 24 calculates only a prediction total traffic volume. A method for calculating a prediction total traffic volume in the prediction graph generation unit 24 is described with reference to FIG. 29. In FIG. 29, the prediction total traffic volume A13 may be represented by an area surrounded by o, p, t, and s and the prediction total traffic volume A13 is calculated on the basis of this area (operation S175).

The prediction graph generation unit 24 stores the calculated prediction total traffic volume and the calculated prediction unused total traffic volume in the prediction traffic volume DB 34 so as to update the prediction traffic volume DB 34 (operation S176). Here, regarding the CL-LIU card 11 of which a prediction graph is not present, calculation of a prediction total traffic volume and a prediction unused total traffic volume is not executed. According to the processing for calculating a prediction traffic volume, it is possible to calculate a prediction total traffic volume and a prediction unused total traffic volume for the CL-LIU cards 11 of which prediction graphs are present.

[Unused Order Determination Processing (Operation S20)]

Figure 30:
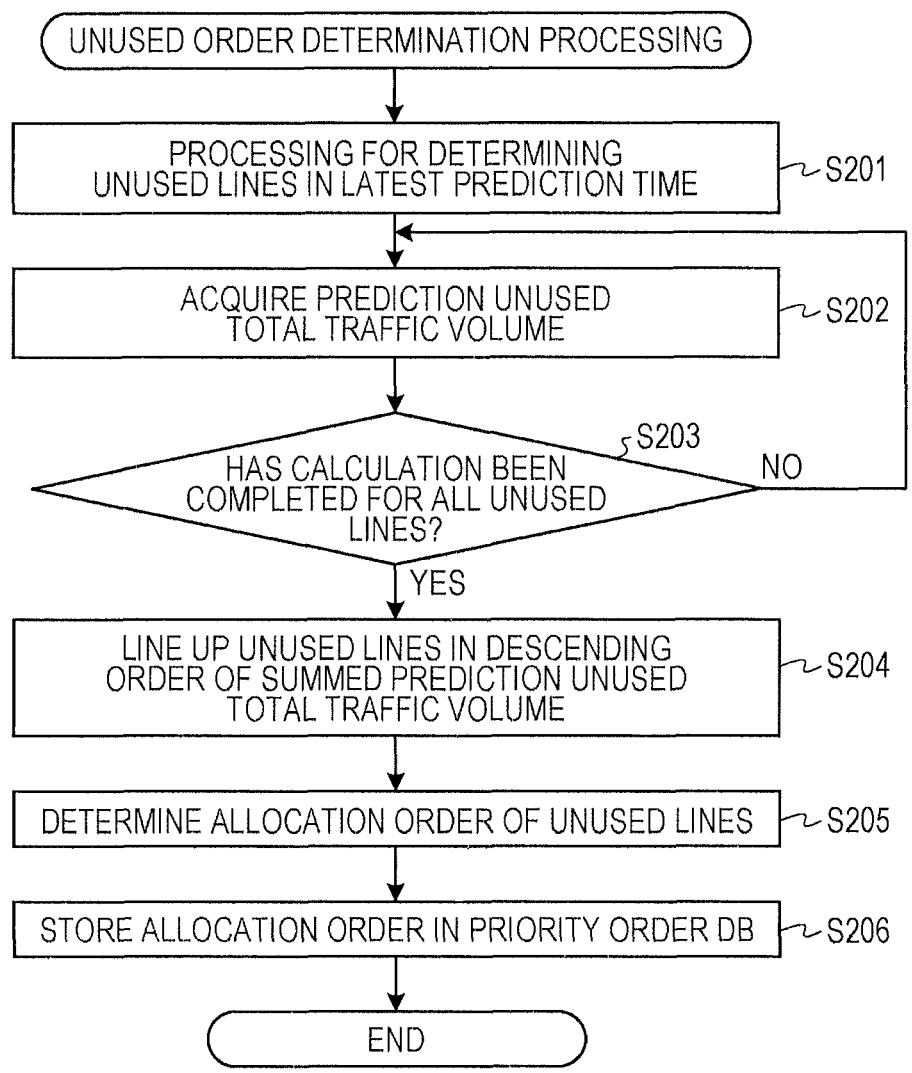
FIG. 30 is a flowchart illustrating an example of unused order determination processing.

FIG. 30 is a flowchart illustrating an example of unused order determination processing. When the unused order determination unit 25 receives information representing demand of order determination from the prediction graph generation unit 24, the unused order determination unit 25 acquires the prediction unused total traffic volume of each of the CL-LIU cards 11 from the prediction traffic volume DB 34. When unused lines 14 (lines L1 to L8) are present within the latest prediction time in the prediction graph of each of the CL-LIU cards 11 among the lines L1 to L8, the unused order determination unit 25 determines the number of lines 14 which are unused. In the example of FIGS. 23 to 27, unused lines in prediction time T1 are the line L6 which is allocated to the CL-LIU card 11D and the line L8 which is allocated to the CL-LIU card 11E. Thus, the line L6 and the line L8 are unused lines and accordingly, the number of unused lines is 2 (operation S201).

The unused order determination unit 25 calculates a sum of all prediction unused total traffic volumes in all periods of prediction time for the CL-LIU cards 11 to which the line L6 and the line L8, which are determined as the unused lines, are respectively allocated at current time. For example, when a case of the line L6 is described with reference to FIG. 26, the line L5 and the line L6 are allocated to the CL-LIU card 11D. Prediction unused total traffic volumes of the CL-LIU card 11D are d11 and d12 in prediction time T1, d21 and d22 in prediction time T2, d31 and d32 in prediction time T3, and d41 and d42 in prediction time T4. In this case, the summed prediction unused total traffic volume of the line L6 is calculated by formula 16 (operation S202).

Summed prediction unused total traffic volume of
line $L6 = d11 + d21 + d31 + d41 + d12 + d22 + d32 + d42$     Formula 16

The unused order determination unit 25 compares the number of unused lines with the number of lines of which calculation of the summed prediction unused total traffic volume is completed, so as to determine whether or not calculation of a summed prediction unused total traffic volume has been completed for all of the unused lines (operation S203). When calculation of the summed prediction unused total traffic volume has not been completed for all of the unused lines (negative operation S203), the processing returns to operation S202.

Figure 27:
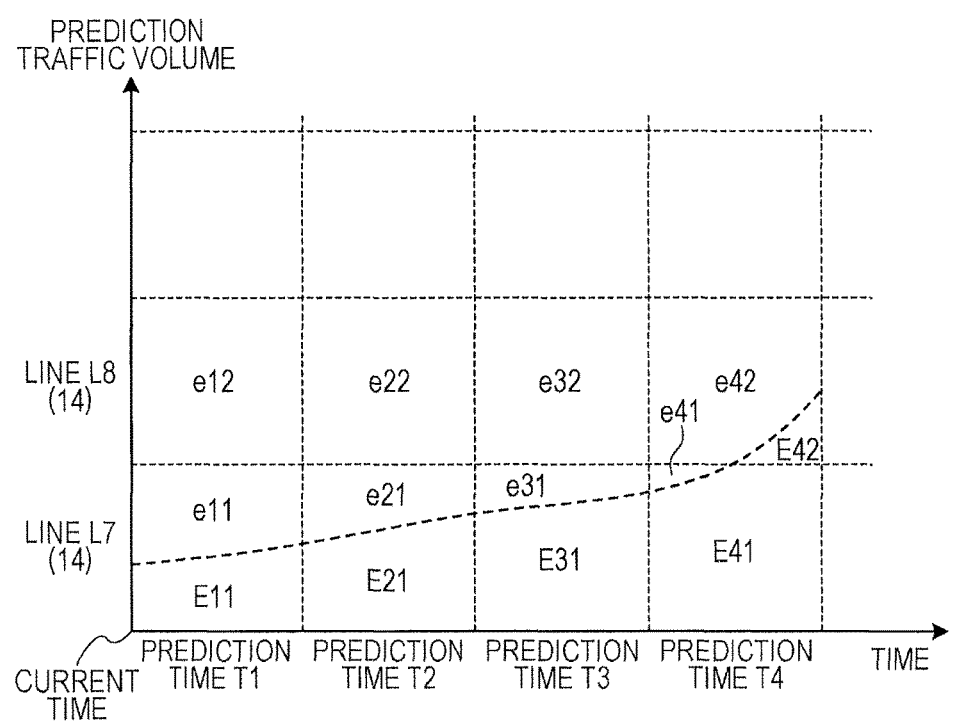
FIG. 27 illustrates an example of a prediction graph of a CL-LIU card E.

The unused order determination unit 25 calculates a summed prediction unused total traffic volume of the line L8 as well by formula 17 with reference to FIG. 27 in a similar manner to the line L6.

Summed prediction unused total traffic volume of
line $L8 = e11 + e21 + e31 + e41 + e12 + e22 + e32 + e42$     Formula 17

When calculation of a summed prediction unused total traffic volume has been completed for all of the unused lines (positive in operation S203), the unused lines are lined up in a descending order of the summed prediction unused total traffic volume (operation S204). In the example of the prediction graphs of FIGS. 26 and 27, when the summed prediction unused total traffic volumes of the line L6 and the line L8 are compared with each other, formula 18 is obtained.

$d11 + d21 + d31 + d41 + d12 + d22 + d32 + d42 > e11 + e21 + e31 + e41 + e12 + e22 + e32 + e42$     Formula 18

The unused order determination unit 25 determines the order in which the unused lines are lined up in a descending order of the summed prediction unused total traffic volume as an allocation order of the unused lines (operation S205). In the above example, the line L6 is on the first in the unused line order and the line L8 is on the second in the unused line order, as illustrated in FIG. 7. The unused order determination unit 25 stores the determined unused line order in the priority order DB 35 (operation S206). According to the unused order determination processing, it is possible to determine an order for allocation of lines 14 which are unused to the CL-LIU cards 11.

[Order Determination Processing (Operation S21)]

Figure 31:
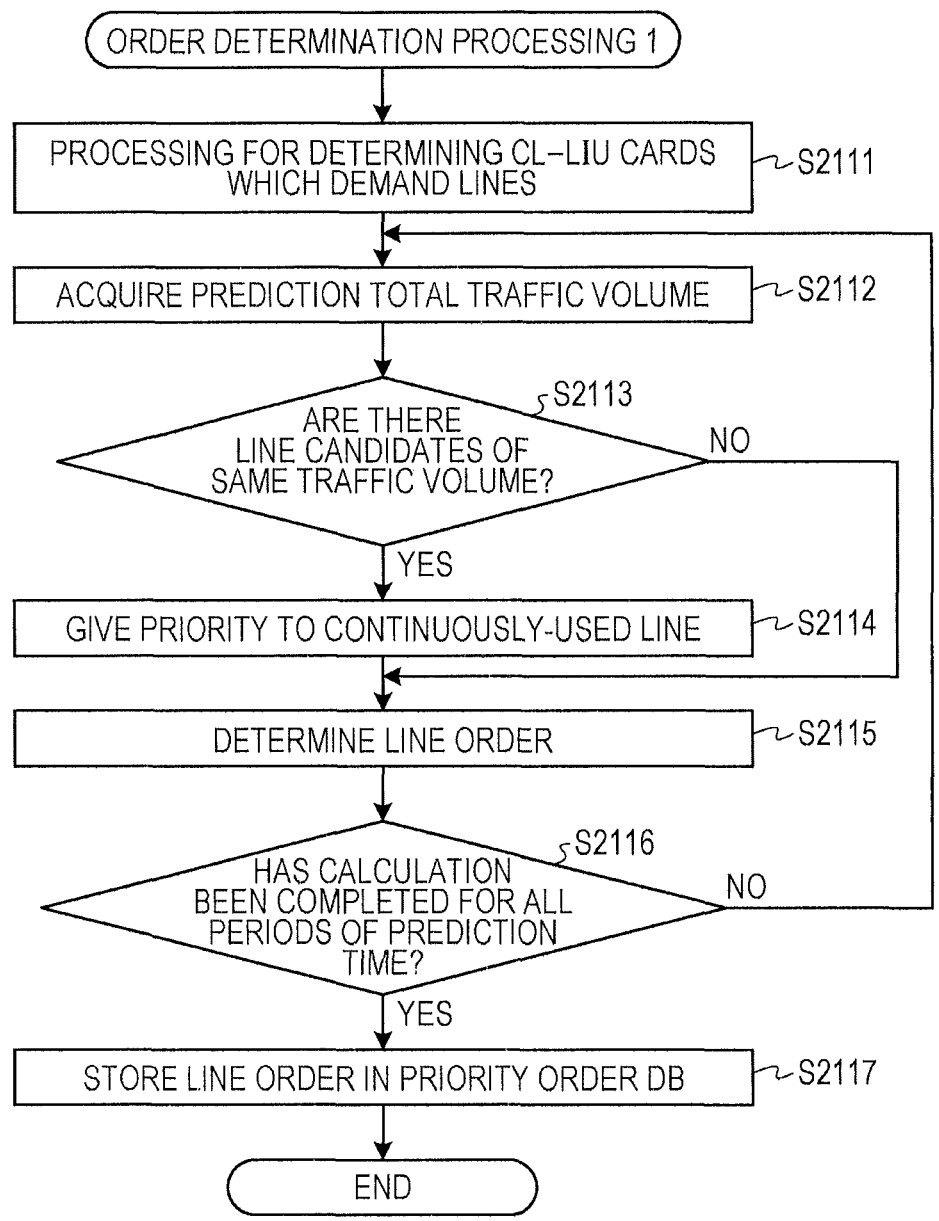
FIG. 31 is a flowchart illustrating an example of order determination processing.

FIG. 31 is a flowchart illustrating an example of order determination processing. In the order determination processing illustrated in FIG. 31, an order is determined so that the number of terminals to which a network is available becomes maximum, for each period of prediction time. Further, the prediction graphs of the CL-LIU cards 11A to 11E are described with reference to FIGS. 23 to 27.

The order determination unit 26 determines CL-LIU cards 11 which demand the lines 14 (lines L1 to L8) in prediction time T1, on the basis of the prediction graphs of the CL-LIU cards 11A to 11E (operation S2111). In the prediction graphs of the CL-LIU cards 11A to 11E, all of the CL-LIU cards 11 demand the lines 14 in prediction time T1.

The order determination unit 26 calculates prediction total traffic volumes in all periods of prediction time T1 to T4 in a similar manner to operation S175 in the processing for calculating a prediction traffic volume (operation S2112). Here, FIG. 32 illustrates an example of a prediction total traffic volume corresponding to prediction time of each CL-LIU card. Further, it is assumed that, for example, A11 of each prediction total traffic volume is a line candidate to be line-allocated on the line 14 for the route.

The order determination unit 26 lines up line candidates illustrated in FIG. 32 in a descending order of the prediction total traffic volume for each period of prediction time. When the line candidates are lined up for prediction time T1, formula 19 is obtained. Similarly, when the line candidates are lined up for prediction time T2, formula 20 is obtained.

$A11 = A12 > B11 > D11 > E11 > B12 > A13 > C11$     Formula 19

$A21 = A22 = B21 = B22 > D21 > E21 > B23 > C21 > A23$     Formula 20

When there are line candidates of the same prediction total traffic volumes when the line candidates in prediction time T1 are lined up (positive in operation S2113), the order determination unit 26 determines an order by giving priority to a line candidate of which a rank order is higher at the preceding prediction graph generation timing (operation S2114). That is, the order determination unit 26 determines an order by giving priority to a line candidate which is continuously used.

When there are no line candidates of same prediction total traffic volumes when the line candidates in prediction time T1 are lined up (negative in operation S2113), the order determination unit 26 determines the order in which the line candidates are lined up as an order (operation S2115). Further, when an order of the line candidates of the same prediction total traffic volume is determined in operation S2114, the order determination unit 26 brings the order together with the order of other line candidates so as to determine an order of the line candidates of prediction time T1 (operation S2115).

The order determination unit 26 determines whether or not a line order of line candidates has been determined for all periods of prediction time T1 to T4 (operation S2116). When there is prediction time in which a line order of the line candidates has not been determined (negative in operation S2116), the order determination unit 26 returns to operation S2112 so as to determine a line order of the line candidates for the rest period of prediction time. When a line order of line candidates has been determined for all periods of prediction time (positive in operation S2116), the order determination unit 26 stores the determined line order in the priority order DB 35 (operation S2117). According to the order determination processing, it is possible to determine a line order on the basis of the prediction total traffic volume.

[Optimization Processing (Operation S22)]

Figure 33:
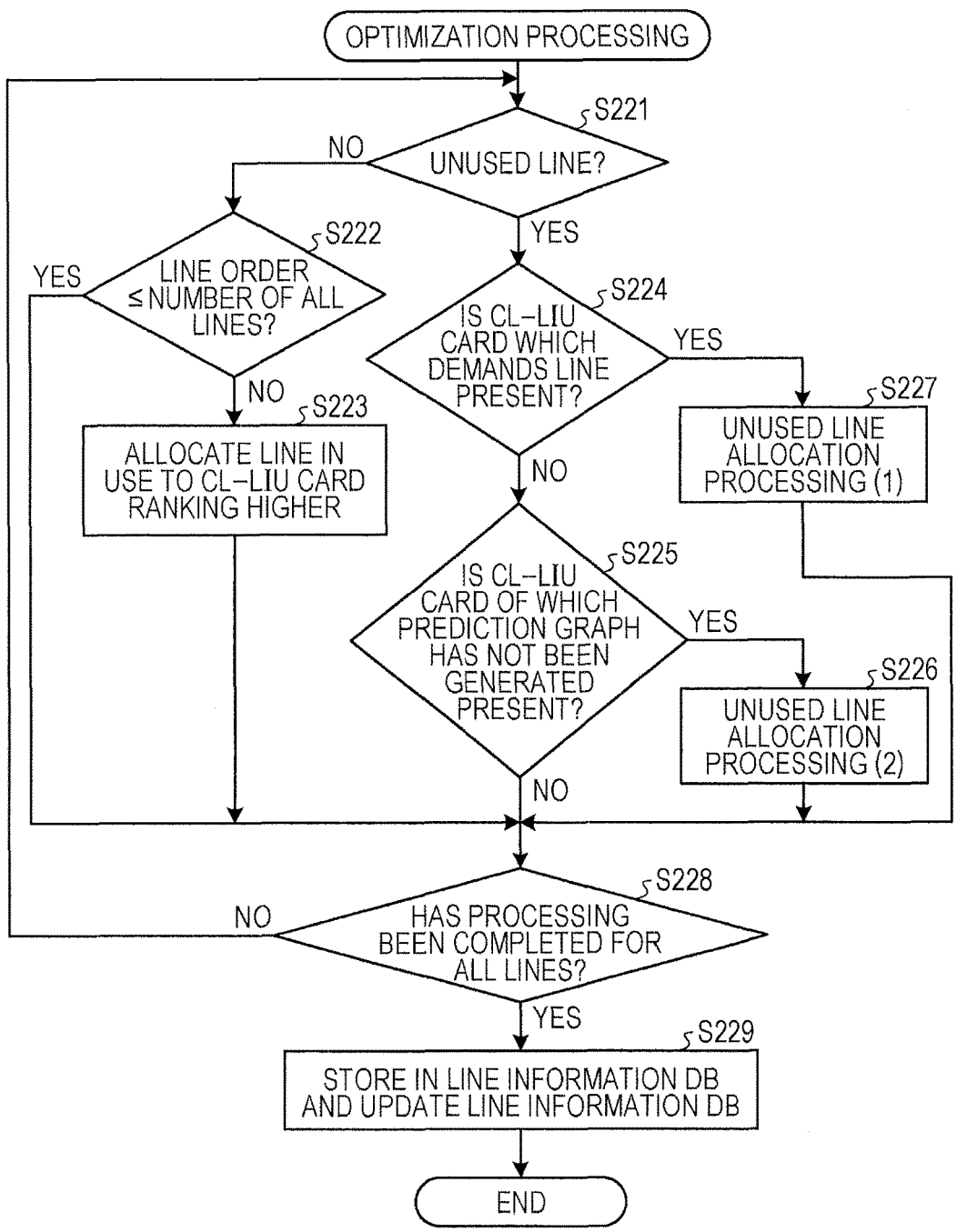
FIG. 33 is a flowchart illustrating an example of optimization processing.

FIG. 33 is a flowchart illustrating an example of optimization processing. The optimization unit 27 determines lines 14 which are to be allocated to respective CL-LIU cards 11 in an order from the line L1 to the line L8 in prediction time T1, on the basis of a line order, the number of unused lines, and an unused line order that are stored in the priority order DB 35. The prediction graphs of the CL-LIU cards 11A to 11E are described with reference to FIGS. 23 to 27. Further, in the prediction graphs of FIGS. 23 to 27, the prediction total traffic volume in prediction time T1 is referred to as a line candidate to be line-allocated for the route.

The optimization unit 27 determines whether or not the line L1 is an unused line in prediction time T1 (operation S221). Referring to the prediction graph of FIG. 23, the line L1 is allocated to the CL-LIU card 11A at current time. Further, A11 of a line candidate to be line-allocated for the route, which is the prediction total traffic volume of the CL-LIU card 11A, is to be transmitted through the line L1 in prediction time T1, so that it is determined that the line L1 is not an unused line (negative in operation S221).

When the line L1 is not an unused line, the optimization unit 27 determines whether or not a line order of the line candidate A11 is equal to or lower than the number of all lines (operation S222). Referring to the line order illustrated in FIG. 8, the line candidate A11 ranks first in the line order in prediction time T1, so that the optimization unit 27 determines that the line order is equal to or lower than the number of all lines which is 8 and determines that execution of line allocation is not demanded (positive in operation S222). When the optimization unit 27 determines that execution of line allocation is not demanded, the optimization unit 27 determines whether or not processing for all lines has been completed (operation S228). The optimization processing has been completed up to the line L1 (negative in operation S228), the optimization unit 27 returns to operation S221. Subsequently, the optimization unit 27 executes optimization processing with respect to the line L2.

Here, regarding the lines L2 to L5, the lines L2 and L3 are allocated to the CL-LIU card 11A, the line L4 is allocated to the CL-LIU card 11B, and the line L5 is allocated to the CL-LIU card 11D at current time. Further, the line 7 is allocated to the CL-LIU card 11E at current time. The prediction total traffic volumes are to be respectively transmitted through the lines L2 to L5 and the line L7 in prediction time T1, as well, as illustrated in FIGS. 23 to 27, so that the optimization unit 27 performs processing similar to that of the line L1.

Figure 26:
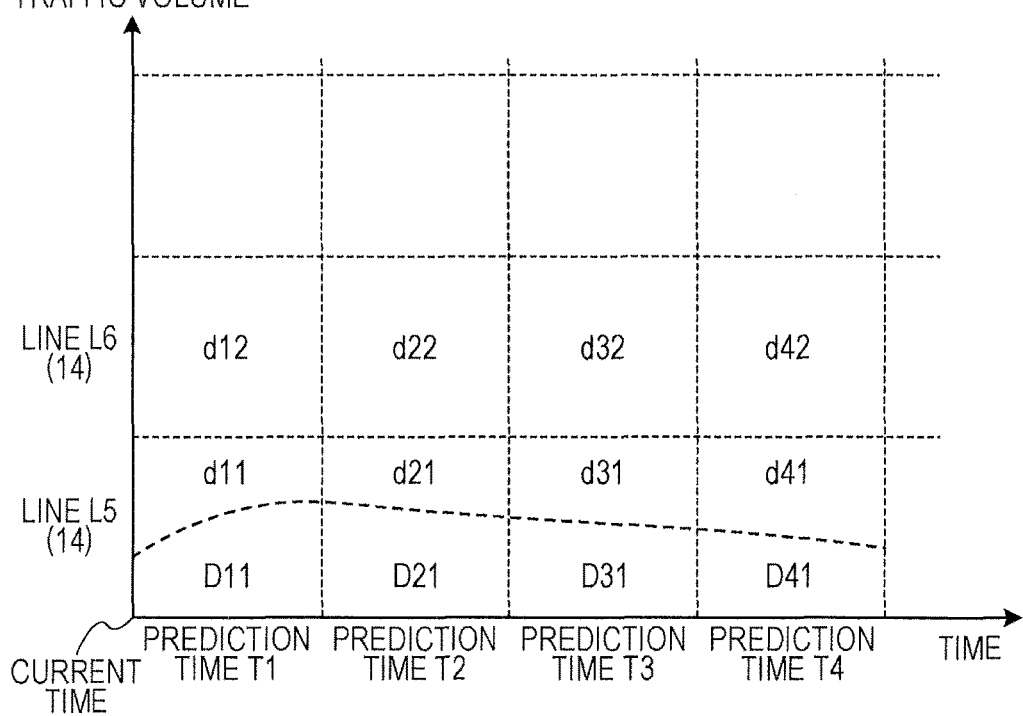
FIG. 26 illustrates an example of a prediction graph of a CL-LIU card D.

Referring to the prediction graphs in FIGS. 26 and 27, the line L6 is allocated to the CL-LIU card 11D at current time. Further, traffic is not to be transmitted through the line L6 in prediction time T1, so that it is determined that the line L6 is an unused line (positive in operation S221).

When the line 6 is an unused line, the optimization unit 27 determines whether or not a CL-LIU card 11 which demands a new line is present in prediction time T1 (operation S224). In the example of FIGS. 23 to 27, the CL-LIU cards 11 which demand new lines are the CL-LIU cards 11B and 11C.

When a CL-LIU card 11 which demands a new line is present in prediction time T1 (positive in operation S224), the optimization unit 27 refers to the number of unused lines and the unused line order illustrated in FIG. 7. The optimization unit 27 determines which line candidate belonging to the CL-LIU card 11B or the CL-LIU card 11C ranks higher in the line order, on the basis of the number of unused lines and the unused line order which are referred.

The optimization unit 27 compares a line candidate B12 of the CL-LIU card 11B with a line candidate C11 of the CL-LIU card 11C in prediction time T1. The prediction total traffic volume of the line candidate B12 is larger, so that the optimization unit 27 allocates the line L6 ranking higher in the unused line order to the CL-LIU card 11B to which the line candidate B12 belongs (operation S227). When the allocation of the line L6 is completed, the optimization unit 27 determines whether or not the processing for all of the lines has been completed (operation S228).

Here, the line L8 is an unused line as is the case with the line L6, as illustrated in FIG. 27, so that processing similar to that of the line L6 is performed so as to allocate the line L8 to the CL-LIU card 11C. When the optimization processing has been completed for all of the lines L1 to L8 (positive in operation S228), the optimization unit 27 stores allocation results in the line information DB 36 (operation S229).

Subsequently, a case in which the number of line candidates is larger than the number of all lines is described. For example, in the line order illustrated in FIG. 8, the number of line candidates is 9 with respect to the number of all lines which is 8, in prediction time T2. Here, it is assumed that the lines L1 to L3 are allocated to the line candidates A11, A12, and A13 in the CL-LIU card 11A and the line L8 is allocated to the line candidate C11 in the CL-LIU card 11C in the line allocation state in prediction time T1. Further, it is assumed that the lines L4 and L6 are allocated to the line candidates B11 and B12 in the CL-LIU card 11B, the line L5 is allocated to the line candidate D11 in the CL-LIU card 11D, and the line L7 is allocated to the line candidate E11 in the CL-LIU card 11E in prediction time T1.

A case in which optimization processing is executed to the line L3 in this state is described. A23 of a line candidate to be line-allocated for the route, which is the prediction total traffic volume of the CL-LIU card 11A, is to be transmitted through the line L3 in prediction time T2, so that it is determined that the line L3 is not an unused line (negative in operation S221). When the line L3 is not an unused line, the optimization unit 27 determines whether or not a line order of the line candidate A23 is equal to or lower than the number of all lines (operation S222). Referring to the line order illustrated in FIG. 8, the line candidate A23 ranks ninth in the line order in prediction time T2 and thus the line order is larger than the number of all lines which is 8, so that a line in use is allocated to a CL-LIU card 11 ranking higher (operation S223).

In the line order in FIG. 8, the line candidate A23 ranks ninth, the line candidate C21 ranks eighth, and the line candidate B23 ranks seventh in prediction time T2. Since the line candidate A23 ranking ninth is the lowest in the line order, the optimization unit 27 allocates the line L3 in use to a CL-LIU card 11 to which a line candidate ranking higher belongs. However, regarding the line candidate C21 ranking eighth, the line L8 is newly allocated for the line candidate C11 in prediction time T1, so that the line candidate C21 is continuously usable in prediction time T2 as well. Therefore, the optimization unit 27 allocates the line L3 which is used by the line candidate A23 in prediction time T1 to the line candidate B23 ranking seventh. That is, the optimization unit 27 allocates the line L3 to the CL-LIU card 11B to which the line candidate B23 belongs. When the optimization processing has been completed for all of the lines L1 to L8 (positive in operation S228), the optimization unit 27 stores allocation results in the line information DB 36 (operation S229).

A case in which there are unused lines but a CL-LIU card 11 which demands a new line is not present is now described. For example, it is assumed that the line L8 is an unused line in prediction time T1. Traffic is not to be transmitted through the line L8 in prediction time T1, so that the optimization unit 27 determines that the line L8 is an unused line (positive in operation S221).

When the line L8 is an unused line, the optimization unit 27 determines whether or not a CL-LIU card 11 which demands a new line is present in prediction time T1 (operation S224). When a CL-LIU card 11 which demands a new line is not present in prediction time T1 (negative in operation S224), the optimization unit 27 determines whether or not a CL-LIU card 11 of which a prediction graph has not been generated is present (operation S225).

When a CL-LIU card 11 of which a prediction graph has not been generated is present (positive in operation S225), the optimization unit 27 allocates the line L8 which is an unused line to the CL-LIU card 11 (operation S226). Here, a case in which a prediction graph has not been generated is a case in which information representing that line allocation processing is performed in equal probability is received from the prediction graph generation unit 24. When a plurality of CL-LIU cards 11 of which prediction graphs have not been generated are present and the number of the CL-LIU cards 11 of which prediction graphs have not been generated exceeds the number of unused lines, the optimization unit 27 determines CL-LIU cards 11 to which the unused lines are to be allocated, in equal probability such that an order is determined by generating random numbers, for example (operation S226). When the optimization processing has been completed for all of the lines L1 to L8 (positive in operation S228), the optimization unit 27 stores allocation results in the line information DB 36 (operation S229).

When CL-LIU cards 11 of which prediction graphs have not been generated are not present (negative in operation S225), the optimization unit 27 does not allocate the unused lines to any CL-LIU cards 11. When the optimization processing has been completed for all of the lines L1 to L8 (positive in operation S228), the optimization unit 27 stores allocation results in the line information DB 36 (operation S229). According to the optimization processing, it is possible to obtain line information for allocating lines 14 to respective CL-LIU cards 11 on the basis of a line order.

[Line Allocation Processing (Operation S23)]

Figures 34, 35:
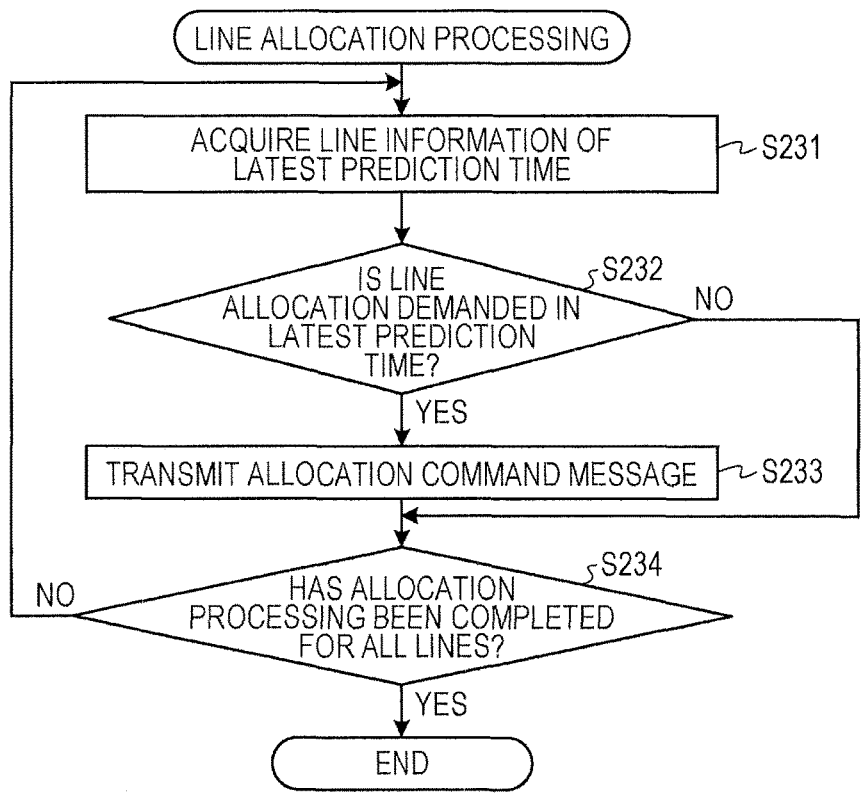
FIG. 34 is a flowchart illustrating an example of line allocation processing.
FIG. 35 illustrates an example of a line allocation command message.

FIG. 34 is a flowchart illustrating an example of line allocation processing. The allocation command unit 28 acquires line information of the latest prediction time (for example, prediction time T1) from the line information DB 36 in each period of prediction time (operation S231). The allocation command unit 28 determines whether or not line allocation is demanded in the latest prediction time in sequence from the line L1 to the line L8, on the basis of the line information (operation S232). When line allocation is demanded (positive in operation S232), the allocation command unit 28 transmits an allocation command message at timing of the following prediction time, that is, at following prediction graph generation timing (prediction graph generation time). The allocation command unit 28 transmits the allocation command message to the line controller 112 of the corresponding CL-LIU card 11 and the line allocation unit 113 of the switch card 12 (operation S233). The line controller 112 and the line allocation unit 113 perform allocation of lines 14 (lines L1 to L8) in accordance with the allocation command message. FIG. 35 illustrates an example of a line allocation command message. The example of FIG. 35 illustrates an allocation command message of a case in which allocation of the line L6 is changed from the CL-LIU card 11D to the CL-LIU card 11B in prediction time T1. When line allocation is not demanded (negative in operation S232), the allocation command unit 28 goes to operation S234 without transmitting an allocation command message.

The allocation command unit 28 determines whether or not allocation processing for all lines has been completed (operation S234). When the allocation processing for all lines has not been completed (negative in operation S234), the allocation command unit 28 returns to operation S231 to perform allocation processing for the rest of lines 14. When the allocation processing for all lines has been completed (positive in operation S234), the allocation command unit 28 ends the line allocation processing of the transmission device 1. According to the line allocation processing, it is possible to perform line control of the line controller 112 and the line allocation unit 113 by generating and transmitting an allocation command message on the basis of line information.

The transmission device 1 of the first embodiment generates a prediction graph based on a traffic volume in normal time and a traffic volume in abnormal time for each CL-LIU card (route) so as to perform line allocation on the basis of the prediction graph. Consequently, it is possible to allocate lines having free space to CL-LIU cards (routes) which are expected such that traffic is to exceed a line capacity before the traffic exceeds the line capacity and to suppress an occurrence of fluctuation of band (line) allocation. That is, even if abnormal traffic is generated in a plurality of CL-LIU cards, it is possible to respond to the abnormal traffic respectively because prediction graphs are respectively generated.

Further, when there are unused lines, the transmission device 1 allocates the unused lines to CL-LIU cards (routes) which are expected to have insufficient line capacity for each period S of prediction time. Consequently, it is possible to efficiently use unused lines.

Further, when abnormal traffic is generated, the transmission device 1 generates a prediction graph on the basis of increase/decrease patterns which are identical or similar to an increase/decrease pattern of the abnormal traffic. Consequently, it is possible to enhance accuracy of the prediction graph. Further, when unexpected traffic which is traffic variation whose statistics data is not present is generated, it is possible to collect traffic data because lines may be used in equal probability. Consequently, it is possible to generate following prediction graphs by using the collected data.

Further, a prediction graph which is generated by the transmission device 1 includes the prediction total traffic volume and the prediction unused total traffic volume. Consequently, it is possible to perform line allocation while comparing unused line capacities.

Further, the transmission device 1 sets line candidates to be line-allocated for the route on the basis of the prediction total traffic volume, in the latest prediction time in a prediction graph, so as to determine an order of line allocation. Consequently, it is possible to maximize the number of terminals to which a network is available in each period of prediction time. That is, even if unexpected traffic is generated, it is possible to minimize the number of terminals exhibiting difficulty in communication.

Further, when there are line candidates having the same prediction total traffic volume, the transmission device 1 raises a line order of a CL-LIU card (route) to which a line candidate ranking higher in the line order in the preceding prediction time belongs. Thus, allocation of a line which is continuously used is not changed, being able to reduce a load on a network.

Further, the transmission device 1 determines the upper limit traffic volume and the lower limit traffic volume in normal time on the basis of a normal prediction graph, and detects abnormal traffic when the traffic volume is equal to or larger than the upper limit traffic volume or smaller than the lower limit traffic volume. Thus, traffic variation in a given width is permitted, being able to avoid frequent detection of abnormal traffic and avoid continuous generation of a prediction graph.

In the first embodiment described above, a line order is determined on the basis of the prediction total traffic volume in the latest prediction time in the order determination processing of operation S21, but a line order may be determined on the basis of the summed prediction total traffic volume of a plurality of periods of prediction time. An embodiment of a case in which a line order is determined on the basis of the summed prediction total traffic volume of a plurality of periods of prediction time is described below as a second embodiment.

Second Embodiment

Figure 36:
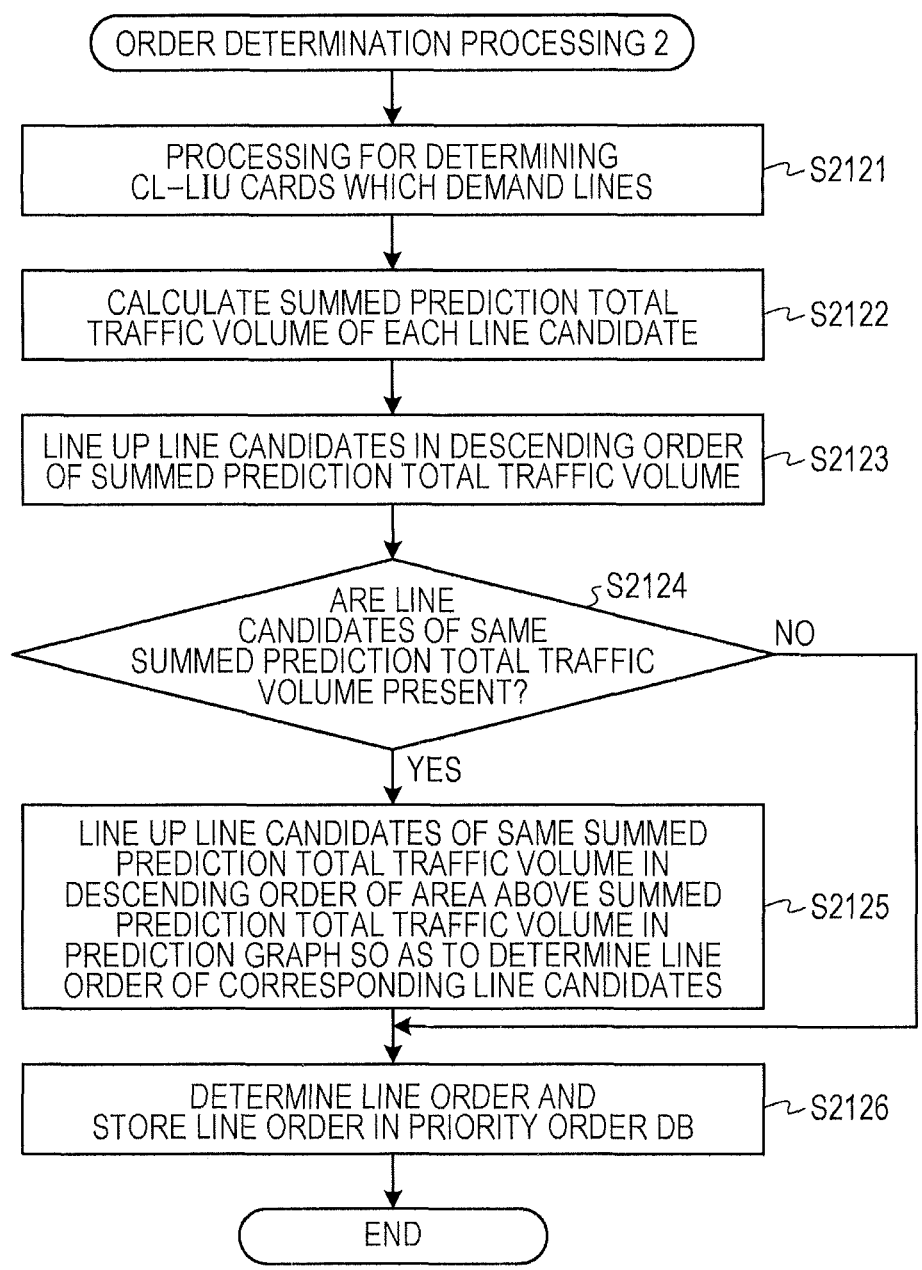
FIG. 36 is a flowchart illustrating another example of the order determination processing.

FIG. 36 is a flowchart illustrating another example of order determination processing. Further, FIG. 37 illustrates another example of a line order in a priority order DB. Here, a transmission device 1 of the second embodiment has the same configuration as the transmission device 1 of the first embodiment and therefore, description of the duplicated configuration and operations is omitted by providing the same reference characters. The transmission device 1 of the second embodiment is different from the transmission device 1 of the first embodiment in that the transmission device 1 of the second embodiment determines a line order on the basis of the summed prediction total traffic volume in the order determination processing of operation S21.

[Order Determination Processing (Operation S21)]

FIG. 36 is a flowchart illustrating another example of the order determination processing. In the order determination processing illustrated in FIG. 36, an order is determined so that optimum line allocation is performed while minimizing a load on a network which is caused by frequent execution of line allocation. Further, prediction graphs of the CL-LIU cards 11A to 11E are described with reference to FIGS. 23 to 27.

The order determination unit 26 determines CL-LIU cards 11 which demand lines 14 (lines L1 to L8) in prediction time T1 on the basis of the prediction graphs of the CL-LIU cards 11A to 11E (operation S2121). In the prediction graphs of the CL-LIU cards 11A to 11E, all of the CL-LIU cards 11 demand the lines 14 in prediction time T1.

The order determination unit 26 calculates the prediction total traffic volume in all periods of prediction time T1 to T4 in a similar manner to operation S175 in the processing for calculating the prediction traffic volume of the first embodiment. Here, calculation results of the prediction total traffic volumes of the CL-LIU cards 11A to 11E are illustrated in FIG. 32 as an example. Further, it is assumed that, for example, A11 of each prediction total traffic volume in prediction time T1 is a line candidate to be line-allocated on the line 14 for the route.

The order determination unit 26 adds the prediction total traffic volume up to the maximum prediction time so as to calculate the summed prediction total traffic volume for each line candidate (operation S2122). Here, a relation between a line candidate and the summed prediction total traffic volume is described by taking the CL-LIU card 11A as an example, with reference to FIG. 23. In FIG. 23, A11, A12, and A13 are line candidates and the maximum prediction time is prediction time T4. A summed prediction total traffic volume 54 of the line candidate A11 is calculated by formula 21. In a similar manner, a summed prediction total traffic volume of the line candidate A12 is calculated by formula 22 and a summed prediction total traffic volume of the line candidate A13 is calculated by formula 23. Here, regarding the summed prediction total traffic volume of the line candidate A13, the prediction graph 53 is decreased to be lower than the line L3 in prediction time T4, so that the prediction traffic volume A34 is omitted in formula 23.

Summed prediction total traffic volume of line candidate $A11 = A11 + A21 + A31 + A11$     Formula 21

Summed prediction total traffic volume of line candidate $A12 = A12 + A22 + A32 + A42$     Formula 22

Summed prediction total traffic volume of line candidate $A13 = A13 + A23 + A33$     Formula 23

The order determination unit 26 calculates the summed prediction total traffic volume for every line candidate for the CL-LIU cards 11B to 11E as well, in a similar manner to the CL-LIU card 11A. That is, the order determination unit 26 calculates the summed prediction total traffic volume for the line candidates B11, B12, C11, D11, and E11 in prediction time T1 of FIG. 32.

When the calculation of summed prediction total traffic volumes of respective line candidates is completed, the order determination unit 26 lines up the line candidates in a descending order of the summed prediction total traffic volume (operation S2123). Here, FIG. 37 illustrates an example of a line order in which line candidates are lined up in a descending order of the summed prediction total traffic volume. The order determination unit 26 determines whether or not line candidates of same summed prediction total traffic volumes are present (operation S2124). When line candidates of same summed prediction total traffic volumes are present (positive in operation S2124), the order determination unit 26 goes to operation S2125. The order determination unit 26 lines up the line candidates of the same summed prediction total traffic volume in a descending order of an area above the summed prediction total traffic volume in the prediction graph (the summed prediction total traffic volume is not included) so as to determine a line order (operation S2125).

For example, a case in which the maximum prediction time is prediction time T2 and summed prediction total traffic volumes of the line candidates A11 and A12 are same as each other in the prediction graph of the CL-LIU card 11A illustrated in FIG. 23 is described. Here, the summed prediction total traffic volumes of respective line candidates of the CL-LIU card 11A are expressed as formulas 24 to 26.

Summed prediction total traffic volume of line candidate $A11 = A11 + A21$     Formula 24

Summed prediction total traffic volume of line candidate $A12 = A12 + A22$     Formula 25

Summed prediction total traffic volume of line candidate $A13 = A13 + A23$     Formula 26

When formulas 24 to 26 are lined up in a descending order of the summed prediction total traffic volume, formula 27 is obtained.

$$(A11+A21)=(A12+A22)>(A13+A23) \quad \text{Formula 27}$$

Since the summed prediction total traffic volume of the line candidate A11 and the summed prediction total traffic volume of the line candidate A12 are same as each other, the order determination unit 26 compares areas above the summed prediction total traffic volumes in the prediction graphs of respective line candidates with each other. The areas above the summed prediction total traffic volumes in the prediction graphs for respective line candidates are expressed in formulas 28 and 29. Further, a comparison result of formulas 28 and 29 is expressed in formula 30.

Line candidate $A11$: area above summed prediction total traffic volume $(A11+A21)=A12+A22+A13+A23$ \qquad Formula 28

Line candidate $A12$: area above summed prediction total traffic volume $(A12+A22)=A13+A23$ \qquad Formula 29

$$A12+A22+A13+A23>A13+A23 \quad \text{Formula 30}$$

The order determination unit 26 determines that a rank order of the line candidate A11 is higher than that of the line candidate A12 from formula 30.

Referring back to the description of FIG. 36, the order determination unit 26 determines a line order on the basis of a result of operation S2125 and stores the line order in the priority order DB 35 (operation S2126).

When line candidates of the same summed prediction total traffic volume are not present (negative in operation S2124), the order determination unit 26 determines the line order in which line candidates are lined up in operation S2123 as a line order and stores the line order in the priority order DB 35 (operation S2126).

The transmission device which executes the order determination processing of the second embodiment sums prediction total traffic volumes of all periods of prediction time for each line candidate and sets a line order in a descending order of the summed prediction total traffic volume. Consequently, it is possible to determine an order so that optimum line allocation is performed while minimizing a load on a network which is caused by frequent execution of line allocation. Accordingly, the transmission device which executes the order determination processing of the second embodiment is capable of further suppressing an occurrence of fluctuation of band (line) allocation while giving the priority to long-term abnormal traffic, compared to the transmission device which executes the order determination processing of the first embodiment.

Further, the transmission device which executes the order determination processing of the second embodiment excludes line candidates of same summed prediction total traffic volumes from all line candidates of CL-LIU cards to which respective line candidates belong. Subsequently, the transmission device calculates and compares summed prediction total traffic volumes of the rest of line candidates respectively. The transmission device raises rank orders of line candidates which belong to CL-LIU cards in which the summed prediction total traffic volumes of the rest of line candidates are large, on the basis of the comparison. Consequently, it is possible to preferentially allocate a line to a CL-LIU card exhibiting heavy traffic.

Here, five CL-LIU cards are provided to the transmission device in each of the embodiments described above, but the number is not limited to five. The number of CL-LIU cards, routes, and router devices may be arbitrarily increased/decreased in accordance with the number of regions to be connected.

Further, eight lines (logical lines) are allocated to the CL-LIU cards in each of the embodiments described above, but the number of lines is not limited to eight. The number of lines may be arbitrarily increased/decreased in accordance with respective routes to be connected and transmission capacity of the backbone line.

Further, the number of periods of prediction time in which prediction of the traffic volume is performed is four in each of the embodiments described above, but the prediction time is not limited to this case. The prediction time may be arbitrarily changed or the number of periods of prediction time may be arbitrarily changed.

Further, constituent elements of respective units which are illustrated in the drawings do not have to be physically configured as depicted in the drawings. That is, specific configurations of distribution/integration of respective elements are not limited to those depicted in the drawings, and all or part of the elements may be configured to be functionally or physically distributed/integrated in an arbitrary unit depending on various types of loads, usage situations, and the like.

Further, all or arbitrary part of various types of processing functions which are performed in respective devices may be executed on a CPU (or a microcomputer such as a micro processing unit (MPU) and a micro controller unit (MCU)). Further, it goes without saying that all or arbitrary part of various types of processing functions may be executed on a program which is analyzed and executed in a CPU (or a microcomputer such as a MPU and a MCU) or hardware controlled by wired logic.

Figure 38:
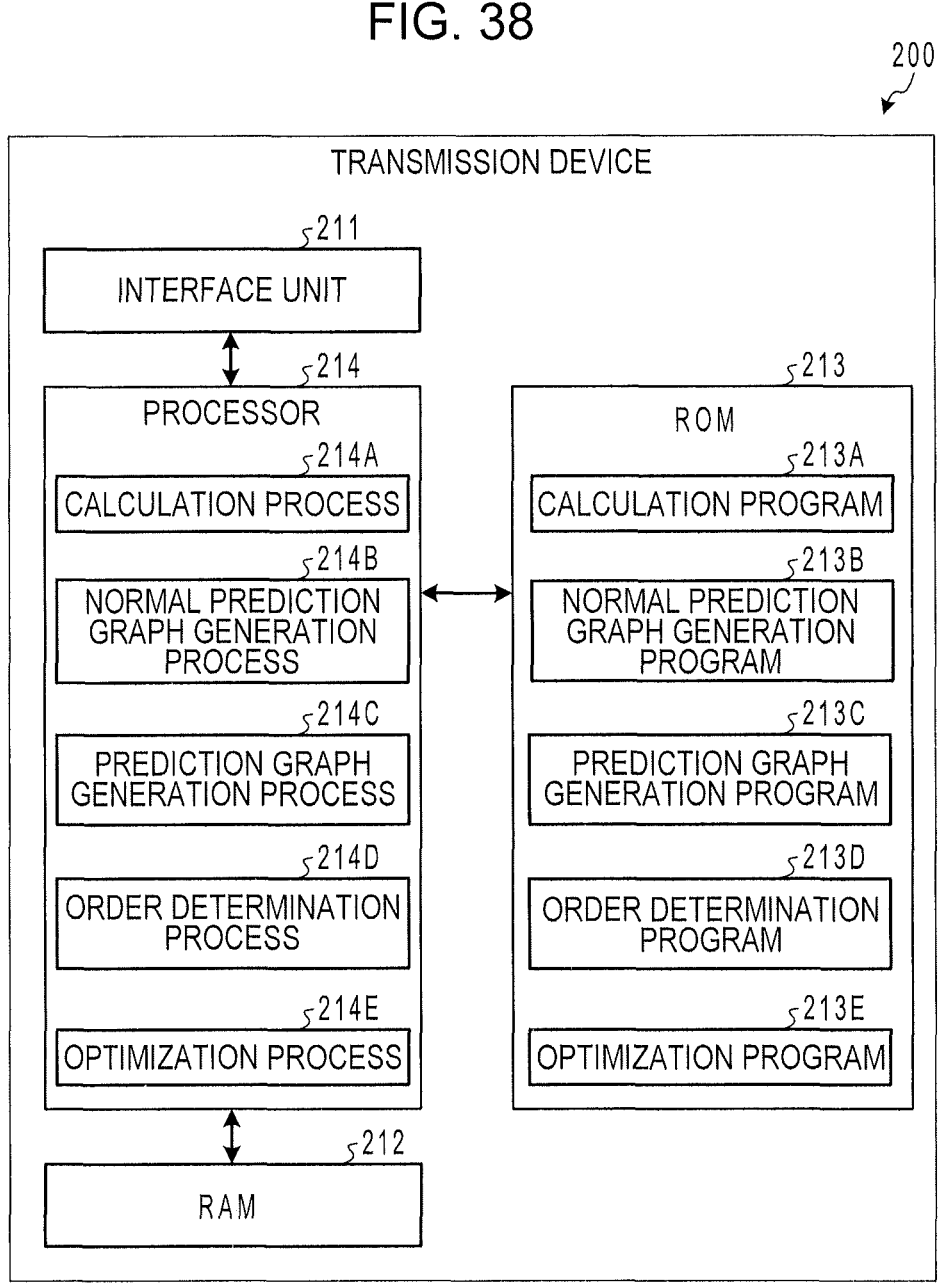
FIG. 38 illustrates an example of transmission device which executes a transmission program.

Here, various types of processing which have been described in each of the embodiments described above may be realized by executing a prepared program by transmission device. An example of the transmission device which executes a program having the same functions as those in each of the embodiments described above is described below. FIG. 38 illustrates an example of transmission device which executes a transmission program.

Transmission device 200 which is depicted in FIG. 38 and executes a transmission program includes an interface unit 211, a random access memory (RAM) 212, a read only memory (ROM) 213, and a processor 214. The interface unit 211 communicates with other transmission device. The processor 214 controls the whole of the transmission device 200.

Further, in the ROM 213, a transmission program exerting functions similar to those of the above-described embodiments is preliminarily stored. Here, the transmission program may be stored in a recording medium which is readable by a drive, which is not depicted, instead of the ROM 213. Further, as the recording medium, a portable recording medium such as a CD-ROM, a DVD disk, and a USB memory, a semiconductor memory such as a flash memory, or the like may be used, for example. Examples of the transmission program include a calculation program 213A, a normal prediction graph generation program 213B, a prediction graph generation program 213C, an order determination program 213D, and an optimization program 213E, as illustrated in FIG. 38. Here, the programs 213A to 213E may be arbitrarily integrated or distributed. Further, in the RAM 212, a database which stores statistics traffic, a normal prediction graph, a prediction graph, a line order, line information, and the like is stored.

The processor 214 reads out these programs 213A to 213E from the ROM 213 so as to execute the respective read-out programs. The processor 214 allows the programs 213A to 213E to function as a calculation process 214A, a normal prediction graph generation process 214B, a prediction graph generation process 214C, an order determination process 214D, and an optimization process 214E respectively, as depicted in FIG. 38.

The processor 214 detects abnormal traffic of each route on the basis of the traffic volume collected for each route. The processor 214 calculates traffic increase/decrease time and a traffic increase/decrease volume of the abnormal traffic. Further, the processor 214 generates a normal prediction graph of each route on the basis of the traffic volume in normal time in which abnormal traffic is not detected. The processor 214 generates an abnormal prediction graph on the basis of the traffic increase/decrease time and the traffic increase/decrease volume of the abnormal traffic in the detection of the abnormal traffic. Further, the processor 214 determines a line order which is a priority order of line allocation with respect to each route, on the basis of a normal prediction graph or an abnormal prediction graph of each route. The processor 214 determines lines to be allocated to respective routes, on the basis of the line order. Consequently, it is possible to allocate lines having free space to routes which are expected such that traffic is to exceed the line capacity before the traffic exceeds the line capacity, being able to suppress an occurrence of fluctuation of line allocation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission method comprising:
    detecting abnormal traffic of a route based on a traffic volume collected for the route;
    calculating a traffic increase or decrease time that is a difference of a current time and a traffic increase or decrease start time, respectively, and a traffic increase or decrease volume that is a difference of an actually-measured traffic volume at the current time and an actually-measured traffic volume at the traffic increase or decrease start time, respectively, of the abnormal traffic;
    generating a normal prediction graph of the route based on the traffic volume in normal time in which the abnormal traffic is not detected;
    generating an abnormal prediction graph based on the traffic increase or decrease time and the traffic increase or decrease volume of the abnormal traffic in detection of the abnormal traffic;
    determining a line order that is a priority order of line allocation for the route based on the normal prediction graph and the abnormal prediction graph of the route;
    determining the route is expected to have traffic that exceeds a line capacity based on the collected traffic volume;
    determining the number of unused lines when there are unused lines, the unused lines being unused in latest prediction time in the normal prediction graph and the abnormal prediction graph of the route, among the lines, and determining an unused line order for allocating the unused lines to routes having deficiency of the lines based on the normal prediction graph and the abnormal prediction graph of each of the routes; and
    when it is determined the route is expected to have traffic that exceeds the line capacity, allocating lines having free space to the route based on the line order before the traffic exceeds the line capacity the number of unused lines, and the unused line order.

2. A transmission device comprising:
    at least one processor; and
    a memory which stores a plurality of instructions, which when executed by the at least one processor, cause the at least one processor to execute:
        detecting abnormal traffic of a route based on a traffic volume collected for the route and calculating a traffic increase or decrease time that is a difference of a current time and a traffic increase or decrease start time, respectively, and a traffic increase or decrease volume that is a difference of an actually-measured traffic volume at the current time and an actually-measured traffic volume at the traffic increase or decrease start time, respectively, of the abnormal traffic;
        generating a normal prediction graph of the route based on the traffic volume in normal time in which the abnormal traffic is not detected;
        generating an abnormal prediction graph based on the traffic increase or decrease time and the traffic increase or decrease volume of the abnormal traffic in detection of the abnormal traffic;
        determining a line order that is a priority order of line allocation for the route based on the normal prediction graph and the abnormal prediction graph of the route;
        determining the route is expected to have traffic that exceeds a line capacity based on the collected traffic volume;
        determining the number of unused lines when there are unused lines, the unused lines being unused in latest prediction time in the normal prediction graph and the abnormal prediction graph of the route, among the lines, and determining an unused line order for allocating the unused lines to routes having deficiency of the lines based on the normal prediction graph and the abnormal prediction graph of each of the routes;
        when it is determined the route is expected to have traffic that exceeds the line capacity, allocating lines having free space to the route based on the line order before the traffic exceeds the line capacity, the number of unused lines, and the unused line order.

3. The transmission device according to claim 2,
    wherein the plurality of instructions, which when executed by the at least one processor, further cause the at least one processor to execute:
        storing a statistics traffic database in which statistics traffic that is statistics data of the traffic volumes collected for the route;
        setting the traffic increase or decrease time and the traffic increase or decrease volume as an increase or decrease parameter and obtaining increase or decrease parameters of identical or resembling to the increase or decrease parameter in detection of the abnormal traffic based on the statistics traffic, so as to extract one or more increase or decrease parameters based on the obtained increase or decrease parameters; and generating the abnormal prediction graph based on the extracted increase or decrease parameters.

4. The transmission device according to claim 2, wherein the normal prediction graph and the abnormal prediction graph include a prediction total traffic volume that is a traffic volume for capacities of the line in a prediction time, and a prediction unused total traffic volume that is an unused traffic volume obtained by excluding the prediction total traffic volume from the capacities of the line in the prediction time.

5. The transmission device according to claim 2, wherein the plurality of instructions, which when executed by the at least one processor, further cause the at least one processor to execute:

setting the line order of the route to which a line candidate to be line-allocated for the route belongs, in a descending order of a prediction total traffic volume that is a traffic volume for capacities of the line in a prediction time, in the normal prediction graph and the abnormal prediction graph of the route, for the prediction time.

6. The transmission device according to claim 5, wherein when there are line candidates of same prediction total traffic volumes, the line order of the route to which the line candidate, of which the line order is high in preceding prediction time, belongs is raised.

7. The transmission device according to claim 2, wherein the plurality of instructions, which when executed by the at least one processor, further cause the at least one processor to execute:

calculating a summed prediction total traffic volume by adding up prediction total traffic volumes that are traffic volumes for capacities of the line in a prediction time, in the normal prediction graph and the abnormal prediction graph of the route, from the latest prediction time to maximum prediction time, for a line candidate to be line-allocated for the route, and setting the line order of the route to which the line candidate belongs in a descending order of the summed prediction total traffic volume.

8. The transmission device according to claim 7, wherein when there are line candidates of same summed prediction total traffic volumes, the line order of the route to which the line candidate belongs is set in a descending order of a prediction traffic volume greater than the summed prediction total traffic volume of the line candidate in the normal prediction graph and the abnormal prediction graph.

9. The transmission device according to claim 2, wherein the plurality of instructions, which when executed by the at least one processor, further cause the at least one processor to execute:

determining, based on the normal prediction graph, an upper limit traffic volume that is an upper limit of the traffic volume in normal time and a lower limit traffic volume that is a lower limit of the traffic volume in the normal time, and detects a case in which the traffic volume is equal to or higher than the upper limit traffic volume or lower than the lower limit traffic volume, as the abnormal traffic.

10. A control card used in a transmission device, comprising:

a processor configured to execute a procedure including:
detecting abnormal traffic of a route based on a traffic volume collected for the route;
calculating a traffic increase or decrease time that is a difference of a current time and a traffic increase or decrease start time, respectively, and a traffic increase or decrease volume that is a difference of an actually-measured traffic volume at the current time and an actually-measured traffic volume at the traffic increase or decrease start time, respectively, of the abnormal traffic;
generating a normal prediction graph of the route based on the traffic volume in normal time in which the abnormal traffic is not detected;
generating an abnormal prediction graph based on the traffic increase or decrease time and the traffic increase or decrease volume of the abnormal traffic in detection of the abnormal traffic;
determining a line order that is a priority order of line allocation for the route based on the normal prediction graph and the abnormal prediction graph of the route;
determining the route is expected to have traffic that exceeds a line capacity based on the collected traffic volume;
determining the number of unused lines when there are unused lines, the unused lines being unused in latest prediction time in the normal prediction graph and the abnormal prediction graph of the route, among the lines, and determining an unused line order for allocating the unused lines to routes having deficiency of the lines based on the normal prediction graph and the abnormal prediction graph of each of the routes; and
when it is determined the route is expected to have traffic that exceeds the line capacity, allocating lines having free space to the route based on the line order before the traffic exceeds the line capacity the number of unused lines, and the unused line order.

* * * * *